United States Patent
Lane et al.

(10) Patent No.: US 8,798,638 B2
(45) Date of Patent: Aug. 5, 2014

(54) METHODS AND APPARATUS FOR PROVIDING BASE STATION POSITION INFORMATION AND USING POSITION INFORMATION TO SUPPORT TIMING AND/OR FREQUENCY CORRECTIONS

(75) Inventors: Frank A. Lane, Easton, PA (US); Rajiv Laroia, Far Hills, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 1057 days.

(21) Appl. No.: 11/216,973

(22) Filed: Aug. 31, 2005

(65) Prior Publication Data

US 2007/0021122 A1    Jan. 25, 2007

Related U.S. Application Data

(60) Provisional application No. 60/701,383, filed on Jul. 20, 2005.

(51) Int. Cl.
*H04W 24/00* (2009.01)

(52) U.S. Cl.
USPC ............. 455/456.1; 455/456.2; 455/456.3; 455/456.4; 455/456.6

(58) Field of Classification Search
USPC ............. 455/11.1, 12.1, 13.1, 13.2, 404.1, 455/404.2, 430, 431, 456.1–457, 524, 525, 455/550.1, 561, 502, 71
See application file for complete search history.

(56) References Cited

U.S. PATENT DOCUMENTS 3,940,695 A   2/1976  Sickles, II
5,063,387 A * 11/1991 Mower .......................... 342/103

(Continued)

FOREIGN PATENT DOCUMENTS

CN    1471642 A   1/2004
JP    8180285 A   7/1996

(Continued)

OTHER PUBLICATIONS

Notification of Transmittal of the International Search Report and the Written Opinion with International Search Report and Written Opinion of the International Searching Authority pp. 1-11, dated Jan. 31, 2007, from PCT Application PCT/US2006/028091.

(Continued)

*Primary Examiner* — Olumide T Ajibade Akonai
(74) *Attorney, Agent, or Firm* — Sam Talpalatsky; Nicholas J. Pauley; Joseph Agusta

(57) ABSTRACT

A wireless terminal receives base station position over an airlink, determines its relative position with respect to the base station and determines a timing adjustment correction. The wireless terminal applies the determined timing correction to control uplink signaling timing and achieve synchronization at the base station's receiver. The wireless terminal determines its relative velocity with respect to the base station and determines a Doppler shift adjustment which it adds to the uplink carrier frequency or to its baseband signal. A wireless terminal determines the position of a moving base station and determines timing and/or frequency corrections. Base station position is determined from the current time and stored information correlating the base station position with time, e.g., for a geo-synchronous satellite. Base station position information is determined from broadcast information, e.g., GPS base station position, for an aircraft base station. Wireless terminals may be mobile and include a GPS receiver for WIRELESS TERMINAL position determination.

50 Claims, 15 Drawing Sheets

(56) References Cited

U.S. PATENT DOCUMENTS

| | | | |
|---|---|---|---|
| 5,463,400 A | 10/1995 | Tayloe | |
| 5,493,309 A * | 2/1996 | Bjornholt | 342/455 |
| 5,742,908 A * | 4/1998 | Dent | 455/517 |
| 5,828,946 A | 10/1998 | Feisullin et al. | |
| 5,844,521 A * | 12/1998 | Stephens et al. | 342/357.1 |
| 5,914,668 A * | 6/1999 | Chavez et al. | 340/7.39 |
| 5,995,041 A * | 11/1999 | Bradley et al. | 342/357.1 |
| 6,020,847 A * | 2/2000 | Upton et al. | 342/357.16 |
| 6,061,561 A * | 5/2000 | Alanara et al. | 455/456.1 |
| 6,449,489 B1 * | 9/2002 | Lu et al. | 455/506 |
| 6,480,787 B2 * | 11/2002 | Yoshikawa et al. | 701/213 |
| 6,603,967 B1 * | 8/2003 | Sinivaara et al. | 455/431 |
| 6,718,174 B2 | 4/2004 | Vayanos | |
| 6,965,753 B1 * | 11/2005 | Miller et al. | 455/12.1 |
| 6,999,724 B2 * | 2/2006 | Chizhik et al. | 455/63.1 |
| 7,027,815 B2 | 4/2006 | Sendonaris | |
| 7,043,265 B2 | 5/2006 | Nir et al. | |
| 7,167,712 B2 * | 1/2007 | Ogino et al. | 455/456.1 |
| 7,215,971 B2 * | 5/2007 | Ormson | 455/502 |
| 7,245,656 B2 * | 7/2007 | Kalhan | 375/220 |
| 7,260,472 B2 * | 8/2007 | Sutardja | 701/117 |
| 7,319,878 B2 * | 1/2008 | Sheynblat et al. | 455/456.3 |
| 7,599,453 B2 | 10/2009 | Wilhelmsson | |
| 2002/0097181 A1 | 7/2002 | Chou et al. | |
| 2005/0073971 A1 * | 4/2005 | Mukai | 370/328 |
| 2005/0128142 A1 * | 6/2005 | Shin et al. | 342/386 |
| 2005/0137786 A1 | 6/2005 | Breed et al. | |
| 2007/0021121 A1 | 1/2007 | Lane et al. | |

FOREIGN PATENT DOCUMENTS

| | | |
|---|---|---|
| JP | 9510067 T | 10/1997 |
| JP | 11275057 A | 10/1999 |
| JP | 2000508155 T | 6/2000 |
| JP | 2000286783 A | 10/2000 |
| JP | 2001501419 | 1/2001 |
| JP | 2001169343 A | 6/2001 |
| JP | 2001174537 A | 6/2001 |
| JP | 2001289933 A | 10/2001 |
| JP | 2004527926 T | 9/2004 |
| JP | 2004297517 A | 10/2004 |
| KR | 10200049034 | 7/2000 |
| KR | 2002 054 231 | 7/2002 |
| WO | WO 96/08882 | 3/1996 |
| WO | WO 98/15071 | 4/1998 |
| WO | WO0059133 A1 | 10/2000 |
| WO | WO 02/31989 | 4/2002 |

OTHER PUBLICATIONS

Notification of Transmittal of International Search Report and the Written Opinion with International Search Report and Written Opinion of the International Searching Authority pp. 1-13, dated Jan. 25, 2007, from PCT Application PCT/US2006/027759.

International Preliminary Report on Patentability—PCT/US2006/027759, International Search Authority—European Patent Office—Jun. 26, 2007.

Taiwan Search Report—TW095126563—TIPO—Jul. 11, 2012.

* cited by examiner

METHODS AND APPARATUS FOR PROVIDING BASE STATION POSITION INFORMATION AND USING POSITION INFORMATION TO SUPPORT TIMING AND/OR FREQUENCY CORRECTIONS

RELATED APPLICATIONS

This application claims the benefit of U.S. Provisional Patent Application Ser. No. 60/701,383 filed Jul. 20, 2005 which is hereby expressly incorporated by reference.

FIELD OF THE INVENTION

The present invention relates mobile communications systems and, more particularly, to method and apparatus for performing timing and/or frequency corrections.

BACKGROUND

Motion complicates communications between wireless terminals and base stations since the motion normally produces changes in the distance between the wireless terminal and base station. The change in relative positions between a wireless terminal and base station can introduce transmission timing errors due to changes in the time required to communicate signals between a base station and the wireless terminal. Motion can also introduce frequency errors which are the result of Doppler shift which occurs due to motion and changes in relative distance between the base station and wireless terminal during the transmission process.

While some systems can tolerate some degree of motion, particularly when the motion is very slow, many systems fail as the relative motion between a base station and wireless terminal increases, e.g., to speeds commonly encountered in moving vehicles such as cars and trains. Airplanes, because they normally travel at even greater speeds then cars or trains, can be particularly problematic for a wireless terminal which is located on a moving airplane.

Where motion occurs, assuming the effect of the motion in terms of relative distance between the base station and wireless terminal can be predicted, transmission timing corrections can be made to compensate for the change in distance. In addition, if the change in distance is known and the rate of change is known, frequency corrections can be made to compensate for Doppler shift.

In one known system where a moving wireless terminal interacted with base stations located at fixed known locations, the wireless terminal was pre-programmed with base station location information. This pre-programmed known base station location information was then used in combination with wireless terminal position information obtained from an external global positioning system (GPS) device that was coupled to the wireless terminal via a cable. In the known system the GPS position information was compared to the pre-programmed known base station location information to determine the relative distance between the fixed known location of the base station which the wireless terminal communicated and the location of the wireless terminal as determined by the GPS device. Changes in the determined distance information were then used to estimate the rate of change in the distance between the base stations fixed location and the wireless terminal's location which changed over time due to motion. Transmission timing corrections were generated in the known system based the determined changes in distance while frequency corrections intended to compensate for Doppler shift were also based on the same information.

While the known system worked adequately for systems where the base stations had known fixed locations which were preprogrammed into the wireless terminal, the approach of relying on fixed known base station location information which is preprogrammed into wireless terminals has several disadvantages and is not suitable for many applications.

For example, the known approach of relying on preprogrammed base station location information is not suitable where the location of a base station is not know at the time of wireless terminal deployment and is therefore not available for pre-programming into the wireless terminal. Such location information may not be available because the base station was not deployed at the time the wireless terminal was deployed. Also, the base station with which a wireless terminal seeks to interact may not have been included in the list of base stations for which location information was preprogrammed into the wireless terminal since it was not foreseen that the wireless terminal would interact with the base station or the location information was not available to the issuer of the wireless terminal, e.g., because the base station corresponded to another service provider's network. Memory constraints may also be responsible for limiting the amount of base station location information preprogrammed into a wireless terminal, e.g., programming a wireless terminal with information indicating the location of all terrestrial base stations on the planet may not be practical.

The known system was not capable of taking into consideration base station motion and relied on base stations having a fixed predetermined known location to support successful communication. While preprogramming of base station location information may be satisfactory for some limited applications, e.g., where network roaming need not be supported, it may not be possible to program a wireless terminal with fixed base station location information because the base station may be in motion, e.g., mounted on a moving vehicle such as an airplane or non-geostationary satellite. In addition, at the time the wireless terminal is deployed, the location of a particular base station may not be known since the base station may be deployed after the wireless terminal enters service.

In view of the above discussion, it should be appreciated that there is a need for methods and apparatus which would allow for a wireless terminal to discover the position of a base station and to then use that position information to take into consideration and compensate for changes in wireless terminal position relative to the base station.

SUMMARY

The invention is directed to methods and apparatus for supporting communication between a wireless terminal and base station including operations pertaining to timing and/or frequency corrections. In some, but not necessarily all embodiments, at least one of the wireless terminal and base station are in motion.

In various embodiments, a wireless terminal receives signals over an airlink from a base station. The received signals may include position information specifying the position of the base station. The wireless terminal determines at least one of a timing and frequency correction based on the base station position which is determined from the received base station signal, e.g., from position information specified in the received signal, and wireless terminal position information. In some embodiments, the timing correction is an uplink roundtrip timing delay correction. In some embodiments, the frequency correction is a Doppler shift correction. In various embodiments the base station position information is location coordinate information, e.g., a latitude/longitude/altitude set of information. In some such embodiments corresponding time tag information is included with the location coordinate information.

In some embodiments, base station position information is communicated at periodic intervals. In some embodiments, the rate of base station position communications is at a rate sufficient to determine the distance between the base station and the wireless terminal such that the determined distance does not change by more than 11 km between updates. In some embodiments, the base station position is communicated at a rate equal to or exceeding one base station position determination per 11 msec.

For some wireless terminals, e.g., stationary wireless terminals, the wireless terminal's position may be pre-programmed. For some wireless terminals, e.g., some mobile nodes including GPS capability, a wireless terminal's position is determined from received GPS signals. For some wireless terminals, the wireless terminal's current position is determined from the location techniques, e.g., triangulation, using received signals, e.g., received beacon signals and/or received base station position information signals from a plurality of base stations. In some embodiments, the wireless terminal is located in an air vehicle and the base station position information is sent by the base station at a rate sufficient to support the timing and/or frequency synchronization requirements of the wireless communication system, e.g., a multiple access orthogonal frequency division multiplexing (OFDM) system, and taking into account the maximum expected speed of the wireless terminal with respect to the base station, e.g., at least one base station position signal per 36 seconds. In some embodiments, the base station position information is sent at least once every 1 second. For example, the base station may be determining its position on a periodic basis, e.g., using a GPS receiver which outputs a position fix every second, and the base station may communicate each fix in its location message broadcast to wireless terminals.

In various embodiments, base station location information is determined by the wireless terminal from base station transmitted signals without the need for the wireless terminal to have pre-stored base station location information. In some such embodiments, the base station transmits a signal which indicates its location at a particular point in time. In some embodiments the base station may transmit a schedule indicating where it will be located at different points in time. In other embodiments the base station can specify in a transmission its location in terms of a path which the base station will follow over time. Such a specification may include a reference location, time at which the base station will be at the location or known distance from the reference location as well as base station velocity and/or direction. From this information, a wireless terminal can determine the base station's position and can compute the base stations expected position over time using the provided information.

In accordance with other embodiments of the invention, base station location is determined by triangulating the position of the base station with which a wireless terminal is seeking to communicate from a signal received from the base station and one or more other signals sources, e.g., signals from other base stations which may have positions known to the wireless terminal. Base station position information obtained from signals received from a base station are used by a wireless terminal to generate one or more correction signals, e.g., timing correction and/or frequency correction signals.

By taking into consideration the effect of motion, frequency and/or timing adjustments can be made to compensate for the effect of Doppler shift and/or changes in the amount of time signals take to travel between a base station and wireless terminal. By making corrections based on the relative motion between the base station and wireless terminal communication can be successfully supported with reduced rates of timing and/or other types of control signaling being exchanged between a base station and mobile node. This is because a wireless terminal can take into consideration changes in its relative position to a base station to make signal adjustments and need not wait for correction and/or adjustment signals to be received from the base station, e.g., as part of a timing control processes.

The methods and apparatus of the present invention are applicable to a wide range of applications but are particularly well suited to OFDM application where it is important that transmitted symbols be able to arrive at a base station in a predictable manner, e.g., with symbols being received from different wireless terminal being received at a base station in a timing synchronized manner. In addition, by taking into consideration the effect of Doppler shift due to motion, the effect of motion on frequency can be taken into account allowing for correction of the frequency shift introduced due to motion during the decoding process and/or before transmitting signals, e.g., to a base station.

The methods and apparatus of the present invention have various features which are applicable to a base station while other features are applicable to mobile terminals. The features can, and in many systems are, used together but this is not necessary in all embodiments. For example, in some embodiments wireless terminals perform various motion based correction operations, e.g., frequency and/or timing corrections, without the base station transmitting location information.

Numerous additional benefits, embodiments and features of the methods and apparatus of the present invention are described in the detailed description which follows.

DETAILED DESCRIPTION

Figure 1:
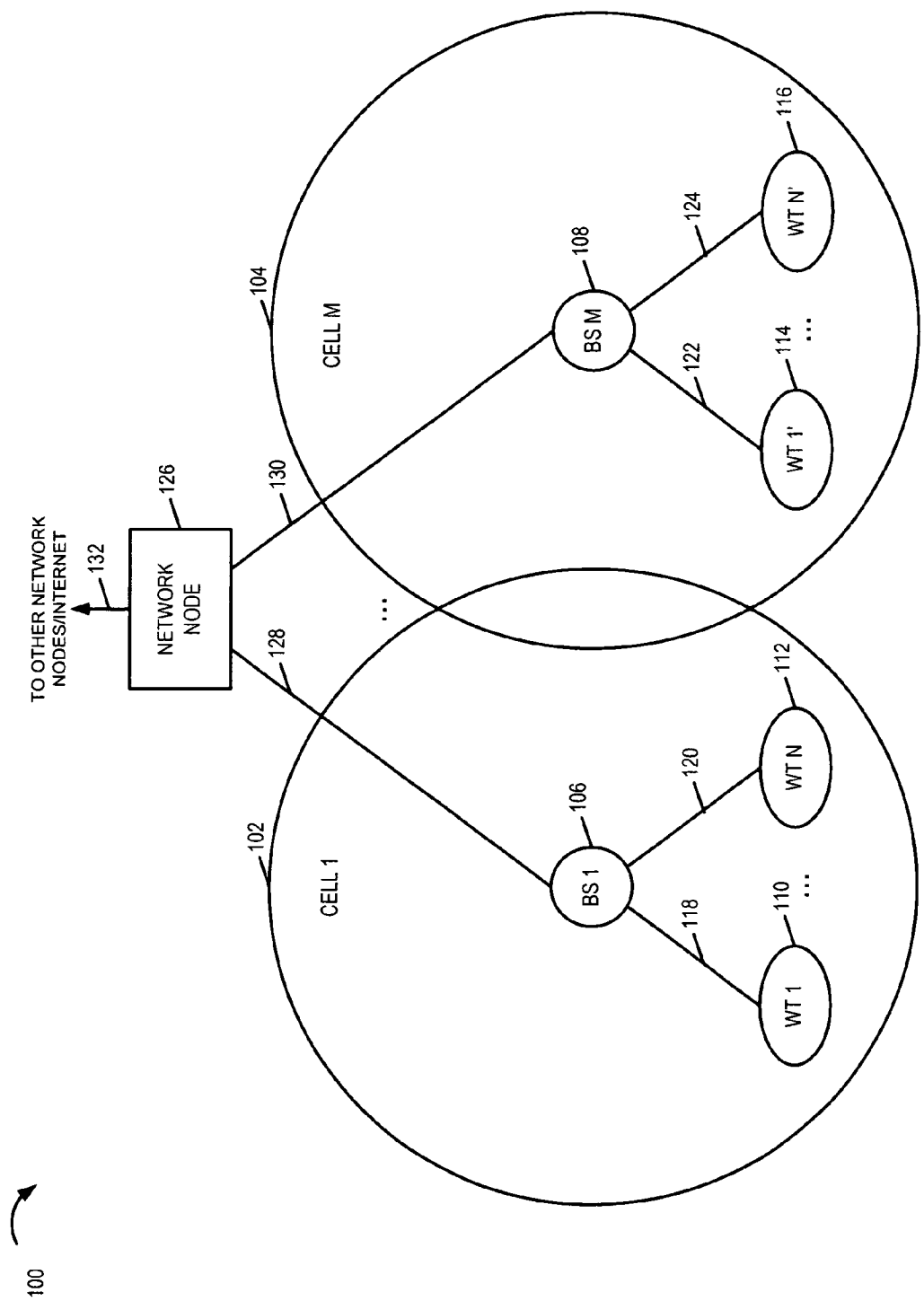
FIG. 1 is a drawing of an exemplary communications system, implemented in accordance with the present invention and using methods of the present invention.

FIG. 1 is a drawing of an exemplary communications system 100, implemented in accordance with the present invention and using methods of the present invention. System 100 includes apparatus and methods directed to performing timing synchronization and/or Doppler shift frequency adjustments in regard to wireless communications between wireless terminals and base stations in accordance with the present invention. Exemplary system 100 may be, e.g., an orthogonal frequency division multiplexing (OFDM) multiple access wireless communication system. System 100 includes a plurality of cells (cell 1 102, cell M 104). Each cell (cell 1 102, cell M 104) represents a wireless coverage area for a corresponding base station (BS 1 106, BS M 108), respectively. Cells (102, 104) may encompass three dimensional regions of coverage. A plurality of wireless terminal (WTs) (WT 1 110, WT N 112, WT 1' 114, WT N' 116) are included in system 100. At least some of the WTs are mobile nodes (MNs); the MNs may move throughout the system 100 and establish wireless links with different BSs, the BS corresponding to the cell in which the WT is currently located. In FIG. 1, (WT 1 110, WT N 112) are coupled to BS 1 106 via wireless links (118, 120), respectively; (WT 1' 114, WT N' 116) are coupled to BS M 108 via wireless links (122, 124), respectively.

The BSs (106, 108) are coupled to network node 126 via network links (128, 130), respectively. Network node 126 is coupled to other network nodes, e.g., routers, other base stations, AAA server nodes, Home Agent nodes, etc. and/or the Internet via network link 132. Network links 128, 130, 132 may be, e.g., fiber optic links, microwave links, etc. Network node 126 and networks links 128, 130, 132 are part of a backhaul network linking various BSs together and providing connectivity so that a WT located in one cell can communicate with a peer node in a different cell.

System 100 is shown having cells with one sector per cell. The methods and apparatus of the present invention are also applicable in systems having more than one sector per cell, e.g., 2, 3, or more than 3 sectors per cell and in systems having different numbers of sectors per cell in different portions of the system. In addition, the methods and apparatus of the present invention are also applicable to many non-cellular wireless communications systems including at least one base station and one wireless terminal.

Figure 2:
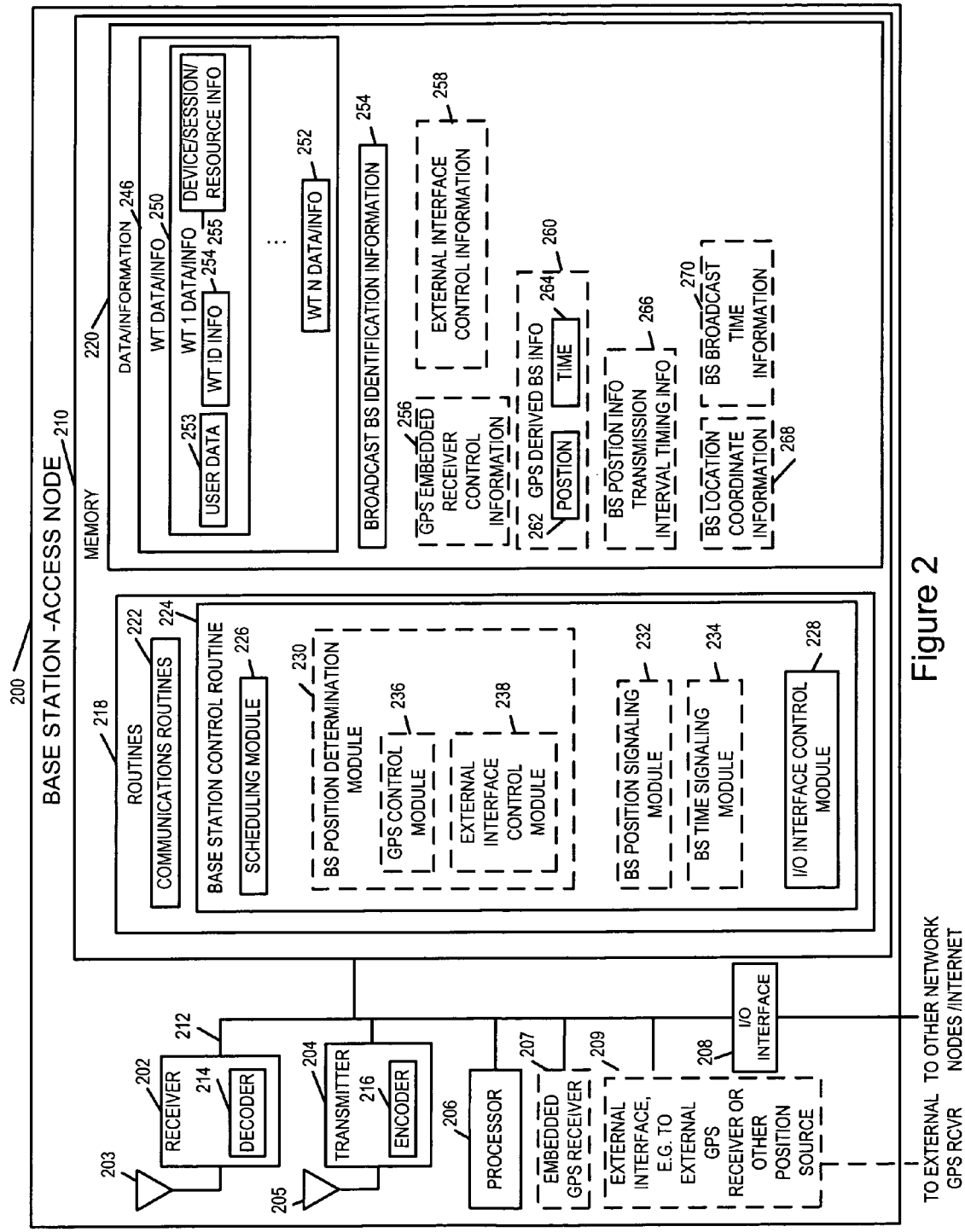
FIG. 2 is a drawing of an exemplary base station implemented in accordance with the present invention and using methods of the present invention.

FIG. 2 is a drawing of an exemplary base station 200, e.g., an OFDM base station, implemented in accordance with the present invention and using methods of the present invention. Exemplary BS 200 may be any of the BSs (106, 108) of FIG. 1. Exemplary BS 200 includes a receiver 202, a transmitter 204, a processor 206, an I/O interface 208, and memory 210 coupled together via a bus 212 over which the various elements may interchange data and information.

Receiver 202 is coupled to receive antenna 203 through which the BS 200 can receive uplink signal from WTs. Receiver 202 includes decoder 214 which decodes received uplink signals. Transmitter 204 is coupled to transmitter antenna 205 through which the BS 200 may transmit downlink signals to WTs. Transmitter 204 includes an encoder 216 for encoding data/information to be transmitted via downlink signals. I/O interface 208 couples the base station to other network nodes and/or the Internet.

In some embodiments, an embedded GPS receiver 207 is included, and is coupled to bus 212. In such embodiments, the GPS receiver can process received GPS signals to obtain an estimated position of the BS. In some such embodiments, the estimated GPS position is broadcast via the downlink, e.g., periodically, for use by WTs. In some embodiments, an external interface 209, e.g., external interface to an external GPS receiver or other position source device, is included and coupled to bus 212. The external interface 209 receives base station position information, which may be broadcast via the downlink.

Memory 200 includes routines 218 and data/information 220. The processor 206, e.g., a CPU, executes the routines 218 and uses the data/info 220 in memory 210 to control the operation of the base station and implement the methods of the present invention. Routines 218 include a communications routine 222 and a base station control routine 224. The communications routines 222 implement the various communications protocols used by the BS 200. In some embodiments, communications module 222 also controls receiver 202 and transmitter 204 operations. Base station control routine 224 includes a scheduling module 226 and an I/O interface control module 226. Scheduling module 226, e.g., a scheduler, schedules air link resources, e.g., uplink and downlink channel segments, to WT users. I/O interface control module 228 controls the operation of I/O interface 208. Various embodiments include one or more of the following modules: base station position determination module 230, BS position signaling module 232, and BS time signaling module 234. BS position determining module 230 determines BS position using internal and/or external position indication sources. In some embodiments, module 230 includes a GPS control module 236, which controls the operation of embedded GPS receiver 207 and the transfer of position information from the receiver. In some embodiments, module 230 includes an external interface control module 238 which controls operation of external interface 209 and the transfer of position information via the interface.

BS position signaling module 232 controls the generation of base station position messages and the transmission of base station position via the downlink. In some embodiments, BS position may be communicated to a WT when the WT registers, while in other embodiments, BS position may be transmitted periodically. BS time signaling module 234, in some embodiments, controls the time at which a BS position is communicated, e.g., maintaining a periodic transmission schedule. BS time signaling module 234, in some embodiments, communicates time information, e.g., appending time tag information to BS position fixes, such that a BS position message communicated via downlink signaling also provides the time the position fix was obtained.

Data/information 220 includes a plurality of sets of WT data/information 246 (WT 1 data/info 250, WT N data/info 252), and broadcast BS identification information 254. WT 1 data/information 250 includes user data 253, WT identification information 254, and device/session/resource information 255. In various embodiments, one or more of the following are included: GPS embedded receiver control information 256, external interface control information 258, GPS derived base station information 260 including position information 262 and time information 264, BS position information transmission interval timing information 266, BS location coordinate information 268, an BS broadcast time information 270.

Figure 3:
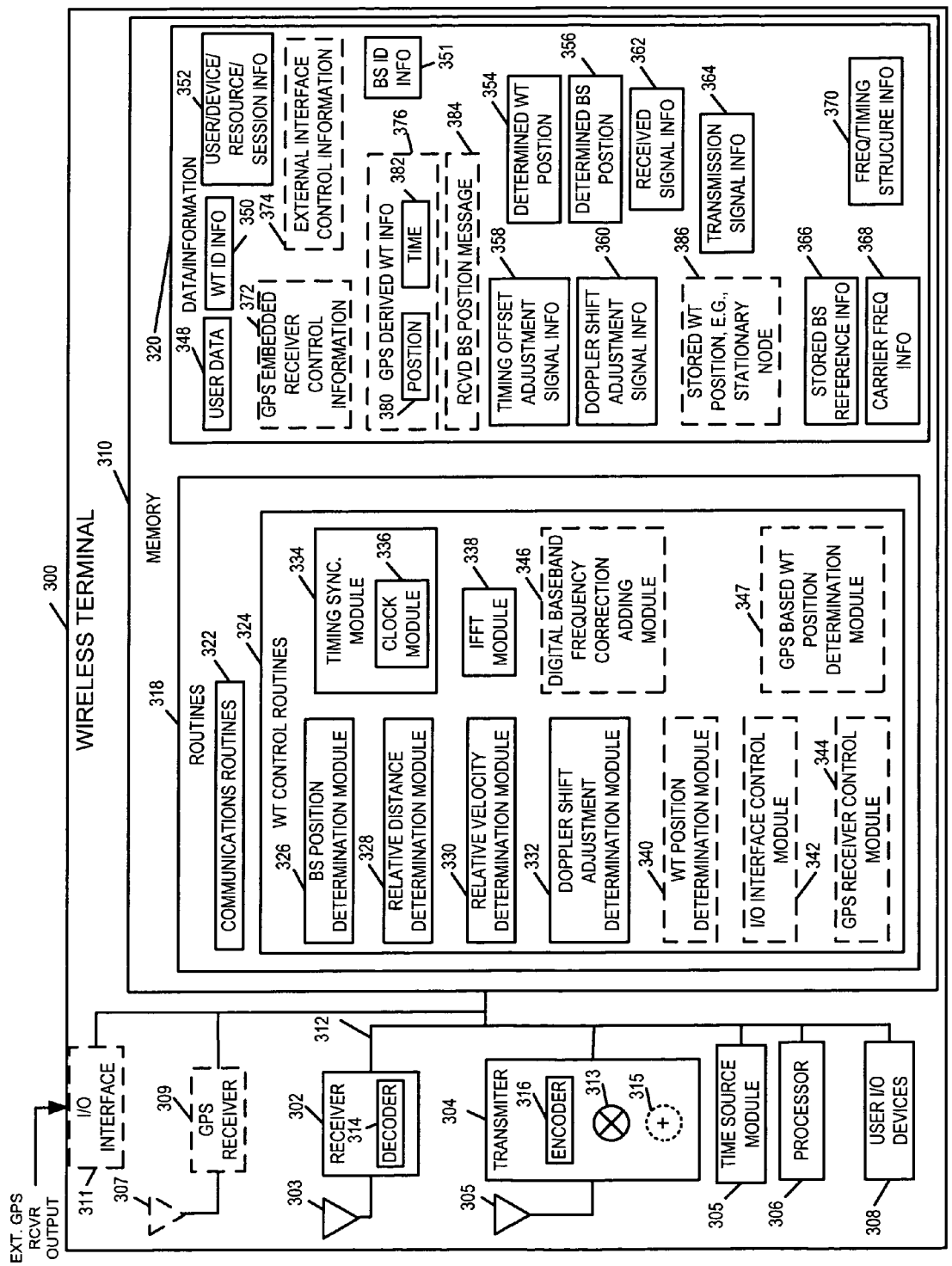
FIG. 3 is a drawing of an exemplary wireless terminal implemented in accordance with the present invention and using methods of the present invention.

FIG. 3 is a drawing of an exemplary wireless terminal (WT) 300 implemented in accordance with the present invention and using methods of the present invention. WT 300 may be any of the WTs (110, 112, 114, 116) of FIG. 1. Exemplary WT 300 includes a receiver 302, a transmitter 304, a processor 306, a time source module 305, user I/O devices 308, and a memory 310 coupled together via a bus 312 over which the various elements may interchange data and information. The memory 310 includes routines 318 and data/information 320. The processor 306, e.g., a CPU, executes the routines 318 and uses the data/information 320 in memory 310 to control the operation of the WT 300 and implement the methods of the present invention.

Receiver 302 is coupled to a receive antenna 303 via which downlink signals are received from base stations including, e.g., beacon signals and BS position messages. Receiver 302 includes a decoder 314 for decoding received downlink signals. Transmitter 304 is coupled to a transmit antenna 305 through which WT 300 transmits uplink signals to base stations. In some embodiments, the same antenna is used for receiver 302 and transmitter 304. Transmitter 304 includes an encoder 316 for encoding uplink signals, and a modulator module 313 for combining a baseband signal with a carrier signal. The baseband signal and/or the carrier signal input to module 313 may include timing and/or Doppler frequency corrections, in accordance with the present invention. In some embodiments, a carrier frequency adder 315 is included which adjusts the carrier frequency by a Doppler correction value. Time source module 305 indicates a current time which is utilized by various modules within the WT 300. User I/O device 308 may include microphone, display, keyboard, keypad, camera, mouse, etc. to allow the user to input and output voice and/or data, and to select functions and control device 300.

In some embodiments, one or more of the following modules are included and coupled to bus 312: a GPS receiver 309 coupled to a GPS antenna 307 for obtaining GPS position information of WT 300 and I/O interface 311 for providing a interface to receive an external GPS output signal. The GPS receiver 309 and/or the I/O interface 311 provide messages including, e.g., a GPS position fix corresponding to the location of WT 300 at a given time, GPS reception status information, GPS receiver status, and/or other GPS information such as individual satellite messages which can be used to derive the position of the WT 300.

Routines 318 include communications routine 322 which performs various communication protocols used by WT 300 and performs some operation related to controlling receiver 302 and transmitter 304. Routine 312 also includes WT control routines 324, which include: a base station position determination module 326, a relative distance determination module 328, a relative velocity determination module 330, a Doppler shift adjustment determination module 332, a timing synchronization module 334 including a clock module 336, and an Inverse Fast Fourier Transform (IFFT) module 338. In some embodiments, WT control routines 324 includes one or more of the following modules: a WT position determination module 340, an I/O interface control module 342, a GPS receiver control module 344, a digital baseband frequency correction adding module 346, and a GPS based wireless terminal position determination module 347.

Base station position determination module 326 determines base station position based on received downlink signals, current time indicated by the time source module 305 and/or stored information, e.g., stored information correlating base station position with time. In some embodiments, different determination methods may be used for different base stations or different types of base stations. For example, the base station may be a stationary or moving base station, which periodically, transmits its current position. In some embodiments, base station position information is received by the WT receiver at time intervals less than or equal to 11 msec. In such an embodiment, the WT can obtain the BS position via received downlink signals including position information. In such an embodiment, with regard to stationary base stations, the WT does not need to include and maintain stored information of the set of base station positions, e.g., a large look-up table associating each of potential base stations with location coordinates. With regard to mobile base stations, e.g., a base station mounted in an airborne platform, the current location of the base station can be determined, e.g., via GPS in the airborne platform, and periodically communicated, e.g., as a broadcast signal to the WT. In some embodiments, with regard to stationary base stations, stored BS reference information includes information associating BS identifiers with BS location coordinates, and a received downlink signal including a BS identifier is used in conjunction with stored BS reference information to obtain BS position. In some embodiments, stored BS reference information includes information associating a moving base station with particular locations as a function of date and/or time of day. For example, the moving BS may be a satellite located base station in a non geo-stationary orbit, e.g., a geo-synchronous orbit, and stored BS reference information may include ephemeris information associated with the satellite and identification information associated with the satellite base station.

Relative distance determination module 328 determines relative distance between base stations and the wireless terminal and generates a timing offset adjustment signal. In some embodiments, updated base station position is received at different points in time and the relative distance determination module 328 operates, using the updated base station position information, at a rate sufficient to determine the distance between the base station and the wireless terminal such that the determined distance does not change by more than 11 km between sequential distance determinations.

Relative velocity determination module 330 determines a relative velocity between a base station and the WT from base station position information received from the base station position determination module 326. Doppler shift adjustment determination module 332 uses the determined relative velocity output from module 330 to determine a Doppler shift adjustment, which is a frequency correction signal. Timing synchronization module 334 includes a clock module 336. Timing synchronization module 334 performs a timing adjustment operation as a function of the determined relative distance. Inverse Fast Fourier Transform module 338 generates a baseband signal for uplink communications. Transmission timing of the uplink signaling is affected by the timing synchronization module 334.

WT position determination module 340 provides wireless terminal position information to the relative distance determination module 328. In some embodiments, the wireless terminal position determination module 340 determines the WT position at different points in time and provides the determined WT position information to the relative velocity determination module 330. In some embodiments, the WT position determination module 340 uses OFDM beacon signals to determine the position of the wireless terminal.

GPS based wireless terminal position determination module 347 uses GPS information obtained from a GPS receiver 309 included in the wireless terminal and/or from an external I/O interface 311 coupled to an external GPS receiver to determine GPS position. GPS receiver control module 344 is used for controlling the operation of GPS receiver 309 and/or an external GPS receiver, e.g., initializing and/or configuring the GPS receiver, sending control messages, requesting output messages such as a periodically transmitted position message. I/O interface control module 342 controls operation of interface 311. In some embodiments, the control operations include reformatting a GPS message and/or controlling the rate of a GPS message being provided to the WT.

Digital baseband frequency correction adding module 346 adds a frequency correction, determined by the Doppler shift adjustment module 332, to a baseband signal to be transmitted. In some embodiments, as an alternative approach to implement frequency signal corrections, the transmitter 304 includes a carrier frequency adder 315 for adding the frequency correction determined by the Doppler shift adjustment module 332 to a carrier frequency being used for uplink signals.

In some embodiments, some of the modules in WT control modules are included in the transmitter 304. For example, the IFFT module 338 and/or digital baseband frequency correction adding module 346 may be included in transmitter 304.

Data/information 320 includes user data 348, WT identifier information 350, base station identifier information 351, user/device/resource/session information 352, determined WT position 354, determined BS position 356, timing offset adjustment signal information 358, Doppler shift adjustment signal information 360, received signal information 362, transmission signal information 364, stored BS reference information 366, carrier frequency information 368, and frequency/timing structure information 370. In some embodiments, data/information 320 includes one or more of the following: GPS embedded receiver control information 372, external interface control information 374, GPS derived WT position information 376 including position information 380 and time information 382, a received BS position message 384, and stored WT position 386.

User data 348 includes voice, video, text, and/or files, of user data/information to be transmitted via transmitter 304 and/or received via receiver 302. Wireless terminal identification information 350 includes a base station assigned WT user identifier. Base station identification information 351 includes information identifying the base station from among a plurality of base stations in the system. User/device/session/resource information 352 includes information identifying users in communication sessions with WT 300, routing information, and assigned uplink and downlink channel segments to be used by WT 300. Determined WT position 354 includes determined positions of WT 300, e.g., the current determined position and/or previous determined WT positions, e.g., one or more time-tagged position determinations. WT determined position information 354 may be from any of the following sources: WT position determination module 340, GPS based position determination module 347, the GPS receiver 309, and external GPS receiver via I/O interface 311, or stored WT position, e.g., corresponding to a stationary node.

Determined base station position 356 is an output from the base station position determination module 326. Information 356 also includes for some base station, e.g., moving base stations, information correlating the position determination to time, e.g., a time tag. Timing offset adjustment signal 358 is an output of the relative distance determination module 326 and is an input to the timing synchronization module 334, e.g., used to alter clock module 336 operations. Doppler shift adjustment signal information 360 is an output from Doppler shift adjustment determination module 332 and is used by either the digital baseband frequency correction adding module 346 or the carrier adder 315 to apply a frequency correction. Received signal information 362 includes signals received via receiver 302. Transmission signal information 364 includes information pertaining to signals communicated via transmitter 304. In some embodiments, with regard to stationary base stations, stored BS reference information 366 includes information associating BS identifiers with BS location coordinates, and a received downlink signal including a BS identifier is used in conjunction with stored BS reference information 366 to obtain BS position. In some embodiments, stored BS reference information 366 includes information associating a moving base station with particular locations as a function of date and/or time of day. For example, the moving BS may be a satellite located base station in a non geo-stationary orbit, e.g., a geo-synchronous orbit, and stored BS reference information may include ephemeris information associated with the satellite and identification information associated with the satellite base station. Carrier frequency information 368 includes information identifying the carrier frequency to be used for uplink signals, e.g., with each of a plurality of different base station points of network attachment that the WT may use in the communications system. Frequency/timing structure information 370 includes information identifying the uplink and downlink timing and frequency structure, e.g., OFDM tone blocks, tone hopping sequence information, channel segment information, OFDM symbol transmission timing intervals and grouping of OFDM symbol transmission time intervals, access information and protocols, etc.

GPS embedded receiver control information 372 includes information used by GPS receiver control module 344 to control operation of embedded GPS receiver 309. External interface control information 374 includes information used by I/O interface control module 342 to control I/O interface 311.

GPS derived WT information 376 includes position information 380 and corresponding time information 382. Position information 380 may be, e.g., a GPS 309 determined position fix of WT 300, an external GPS receiver determined position fix of WT 300, or a GPS based WT position determination module position fix. Time 382 may be a time tag corresponding the time of the position fix in position information 380.

Received base station position message 384 is a received message including base station position which has been communicated over an airlink to WT 300, e.g., as part of a broadcast signal being communicated on a periodic basis. For base stations, which transmit, e.g., periodically, BS position information, the rate of transmission may depend upon the type of base station, e.g., satellite, air vehicle based, stationary ground based, etc. In some embodiments, for some base stations, the WT 300, when performing base station position determination receives base station position information at least once every 36 seconds. In some embodiments, for some base stations, the WT 300, when performing base station position determination receives base station position information at least once every 1 second. In some embodiments, for some base stations, the WT 300, when performing base station position determination receives base station position information at least once every 11 milli-seconds.

Stored WT position information 386, e.g., corresponding to a stationary WT node, is pre-programmed WT position information corresponding to the WT.

Figure 4:
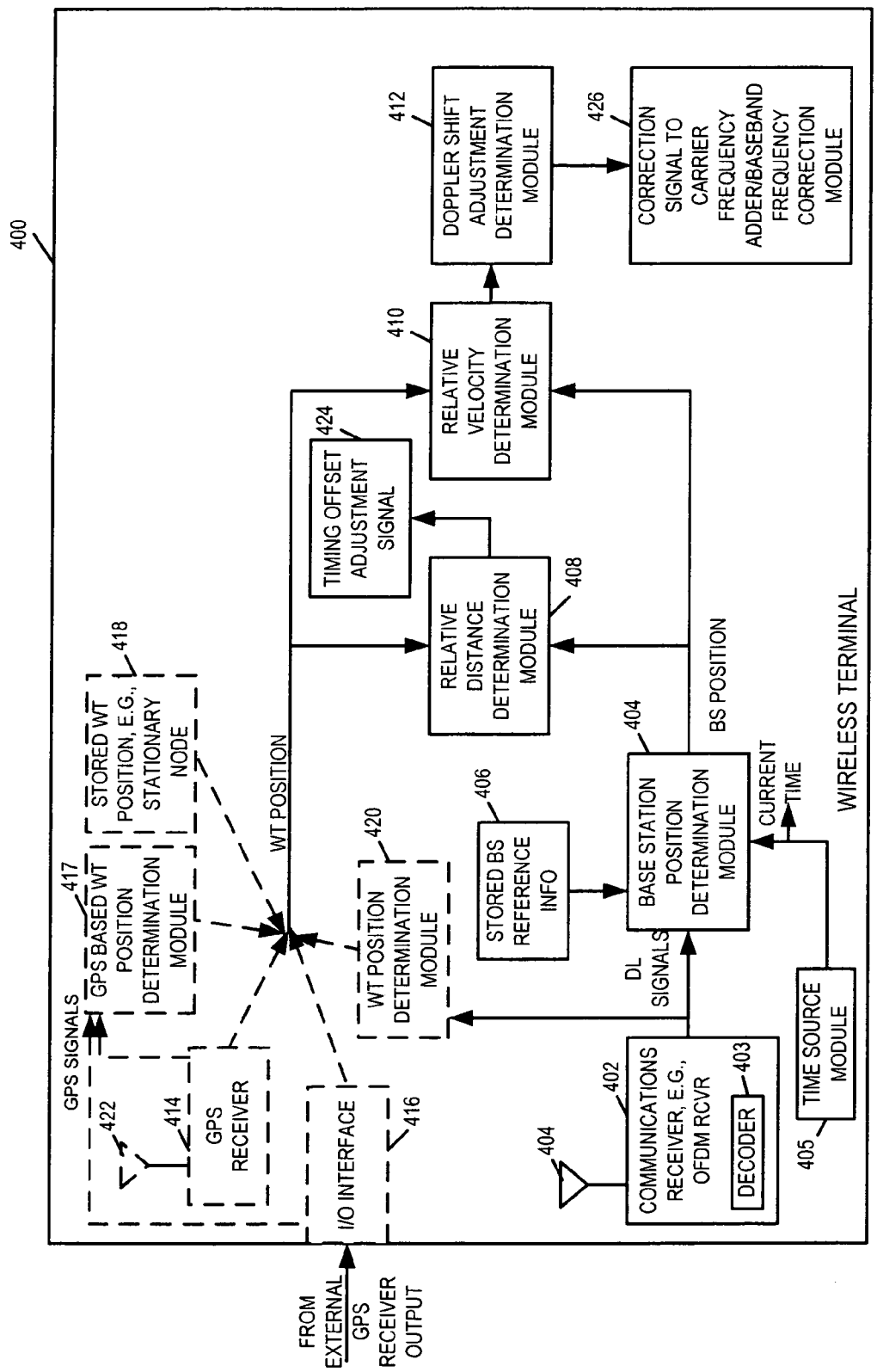
FIG. 4 is a drawing of an exemplary wireless terminal, implemented in accordance with the present invention and using methods of the present invention.

FIG. 4 is a drawing of an exemplary wireless terminal 400, implemented in accordance with the present invention and using methods of the present invention. The WT 400 may be any of the WTs the system 100 of FIG. 1. Similarly named elements of WT 300 of FIG. 3 may correspond to similarly named elements of WT 400 of FIG. 4 and FIG. 5 and/or WT 400' of FIG. 5. FIG. 4 illustrates various elements of exemplary wireless terminal 400 used to determine a timing offset adjustment signal and/or a carrier frequency adjustment signal. Exemplary wireless terminal 400 includes a communications receiver 402, a base station position determination module 404, stored base station reference information 406, a relative distance determination module 408, a relative velocity determination module 410, and a Doppler shift determination module 412. Wireless terminal 400 obtains its position from at least some of the following optional elements: GPS receiver 414, I/O interface 416, GPS based WT position determination module 417, stored WT position 418, WT position determination module 420. Different ones of the optional elements (414, 416, 417, 418, 420) are included in WT 400 depending upon the specific embodiment.

Communications receiver 402, e.g., an OFDM wireless communications receiver, is coupled to a receive antenna 404 through which the WT 400 receives downlink signals. Various downlink signals may include base station current position information, base station identifiers, and/or beacon signals. Communications receiver 402 includes decoder 403, which decodes received downlink signals, e.g., OFDM received signals, which, for some base stations, include base station position information.

Base station position determination module 404 determines base station position based on received downlink signals, current time, and/or stored information. In some embodiments, different determination methods may be used for different base stations or different types of base stations. For example, the base station may be a stationary or moving base station, which periodically, transmits its current position. In such an embodiment, the WT can obtain the BS position via received downlink signals including position information. In such an embodiment, with regard to stationary base stations, the WT does not need to include and maintain stored information of the set of base station positions, e.g., a large look-up table associating each of potential base stations with location coordinates. With regard to mobile base stations, e.g., a base station mounted in an airborne platform, the current location of the base station can be determined, e.g., via GPS in the airborne platform, and periodically communicated, e.g., as a broadcast signal to the WT. In some embodiments, with regard to stationary base stations, stored BS reference information 406 includes information associating BS identifiers with BS location coordinates, and a received downlink signal including a BS identifier is used in conjunction with stored BS reference information 406 to obtain BS position. In some embodiments, stored BS reference information 406 includes information associating a moving base station with particular locations as a function of date and/or time of day. For example, the moving BS may be a satellite located base station in a non geo-stationary orbit, e.g., a geo-synchronous orbit, and stored BS reference information may include ephemeris information associated with the satellite and identification information associated with the satellite base station. A time source module 405, e.g., an accurate clock being maintained by WT 400, provides the current time to the base station position determination module 404 and/or other modules in the WT 400 which utilize current time information in calculations and/or time stamping of information.

The WT position may be determined via any of a plurality of methods. In some embodiments, the WT 400 includes an embedded GPS receiver 414 which receives signals from GPS satellites via GPS antenna 422, and the GPS receiver 414 determines the position of the WT 414. In some embodiments, the WT 400 includes an I/O interface 416 coupled to an external GPS receiver with GPS antenna, co-located in the vicinity of WT 400, which outputs position information. In some embodiments, the GPS receiver and/or I/O interface 416 outputs GPS signals, e.g., position fix messages optionally including corresponding uncertainty information, position/velocity/time messages optionally including corresponding uncertainty information, and/or individual GPS satellite messages optionally including corresponding uncertainty information, which are forwarded to the GPS based WT position determination module 417 which processes, e.g., combines and/or filters, the data and determines the WT position. In some embodiments, the GPS based WT position determination module 417 estimates WT position during outages of GPS reception, e.g., using extrapolation and/or other position reference sources. In some embodiments, e.g., where the WT 400, is a stationary node, stored WT position information 418 may be loaded in the WT 400 and utilized. For example, if the WT is a stationary node, at the time of installation, a GPS unit may be used to determine the site location, and then the information may be loaded into WT 400 for subsequent use. In some embodiments, a WT position determination module 420 is used to determine WT position, e.g., using relative strength measurements from various beacon signals transmitted by base stations at known locations, and then using triangulation techniques.

Relative distance determination module 408 uses the determined BS position and the determined or obtained wireless terminal position to calculate a timing offset adjustment signal 424. The timing offset adjustment signal 424 is calculated during an initialization and/or during operation. For example, for some applications where the relative distance between the WT and the base station does not change significantly while connected to the BS and the relative velocity between the WT and the BS remains low, an initial timing adjustment signal may be determined and applied, without further adjustments based on the relative distance between WT and BS, during the communications session. In other embodiments, e.g., where the relative distances between WT and BS may vary significantly and/or where the relative velocities may be high, the relative distance determination module 408 may determine an initial timing offset adjustment and periodically determine a revised timing offset adjustment signal.

Relative velocity determination module 410 uses BS position information and WT position information, e.g., in coordination with time information, to determine the relative velocity of the wireless terminal with respect to the base station. For example, BS position and WT position signals, may be received, e.g., periodically, at known intervals, e.g., 1 second intervals, by the relative velocity determination module, which calculates the velocity. In some embodiments, the relative velocity determination module 410 includes timing circuitry, and the most recent available WT and/or BS position information is made available to the relative velocity determination module 410.

The Doppler shift determination module 412 receives relative velocity determination signals and outputs a correction signal 426 for the carrier frequency adder or a baseband frequency correction module, e.g., depending upon the embodiment.

Figure 5:
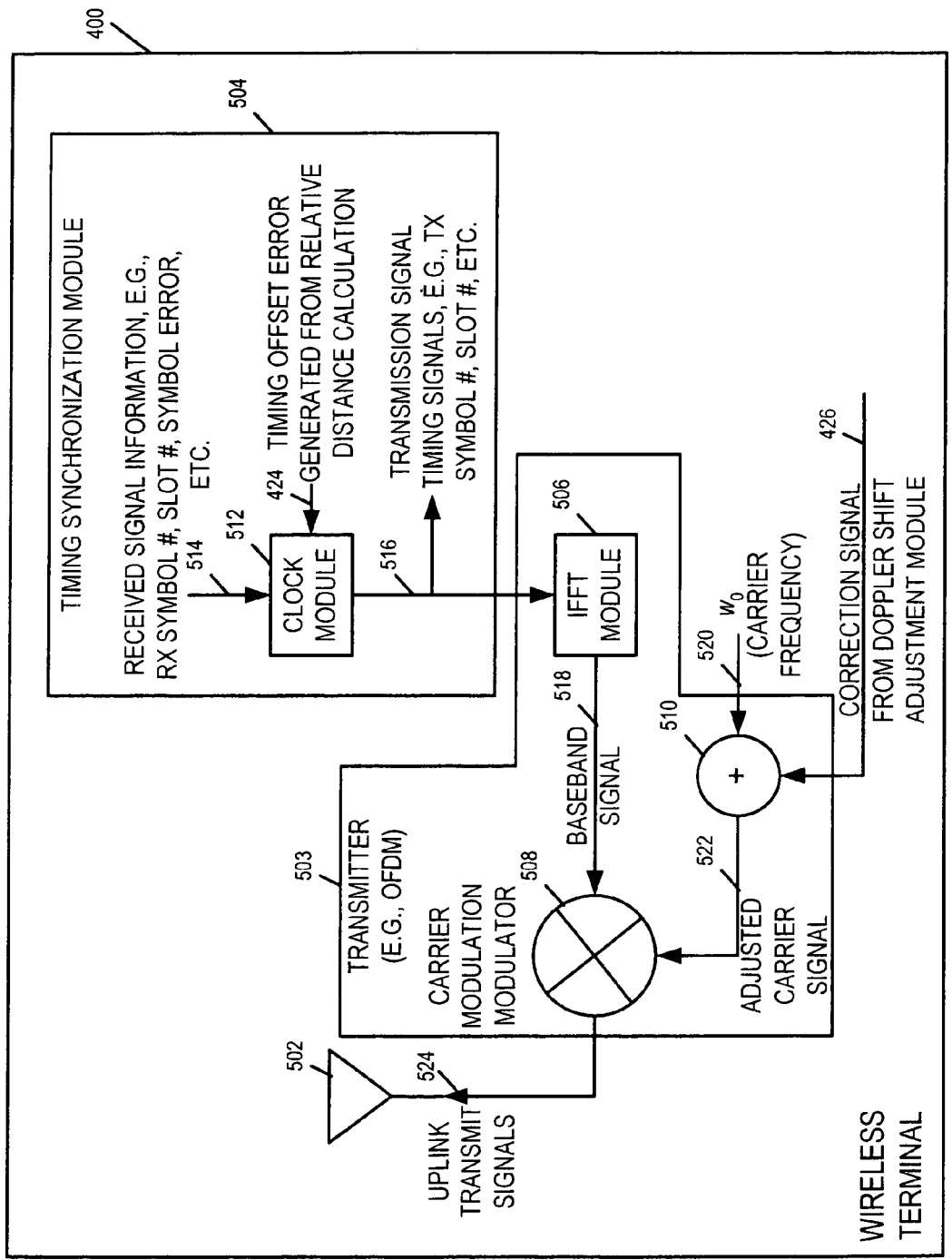
FIG. 5 is another drawing of the exemplary wireless terminal of FIG. 4, implemented in accordance with the present invention and using methods of the present invention.

FIG. 5 is another drawing of exemplary wireless terminal 400, implemented in accordance with the present invention and using methods of the present invention. Exemplary WT 400 includes elements illustrated in FIG. 4 and FIG. 5. FIG. 5 illustrates various elements of exemplary wireless terminal 400 used to apply a timing offset adjustment signal and/or a carrier frequency adjustment signal, in accordance with the present invention. Exemplary wireless terminal 400 includes a timing synchronization module 504, an Inverse Fast Fourier Transform Module 506, a carrier frequency adder 510, a carrier modulation modulator 508, and a transmit antenna 502. In this exemplary embodiment, the IFFT module 506, carrier modulation modulator 508, and frequency adder 510 are included as part of the transmitter 503, e.g., an OFDM transmitter.

The timing and synchronization module 504 includes a clock module 512. Information 514 received from and/or derived from downlink signals, e.g., received symbol number, slot number, symbol error, etc., is input to the clock module 512. Also, timing offset error 424, generated from the relative distance calculation, is also input to the clock module 512. Clock module 512 generates transmission signal timing signals 516, e.g., conveying transmission symbol number and slot number. The transmission symbol timing signals 516 are forwarded to the IFFT module 506, where the IFFT module 506 generates baseband signals 518, e.g., a sequence of symbols, where symbol timing is controlled in accordance with the signals 516. The baseband signals 518 are input to modulator 508.

Carrier frequency adder 510 receives carrier frequency $\omega_0$ 520, e.g., the nominal uplink carrier frequency associated with a base station network attachment point, and a correction signal 426 from the Doppler shift adjustment determination module 412. The carrier frequency adder 510 adds signals 520 and 426 generating an adjusted carrier signal 522, which is input to modulator 508.

Carrier modulation module 508 modulates the baseband 518 on the adjusted carrier signal 522 generating uplink transmit signals 524 which are transmitted to the base station via transmit antenna 502.

Figure 5A:
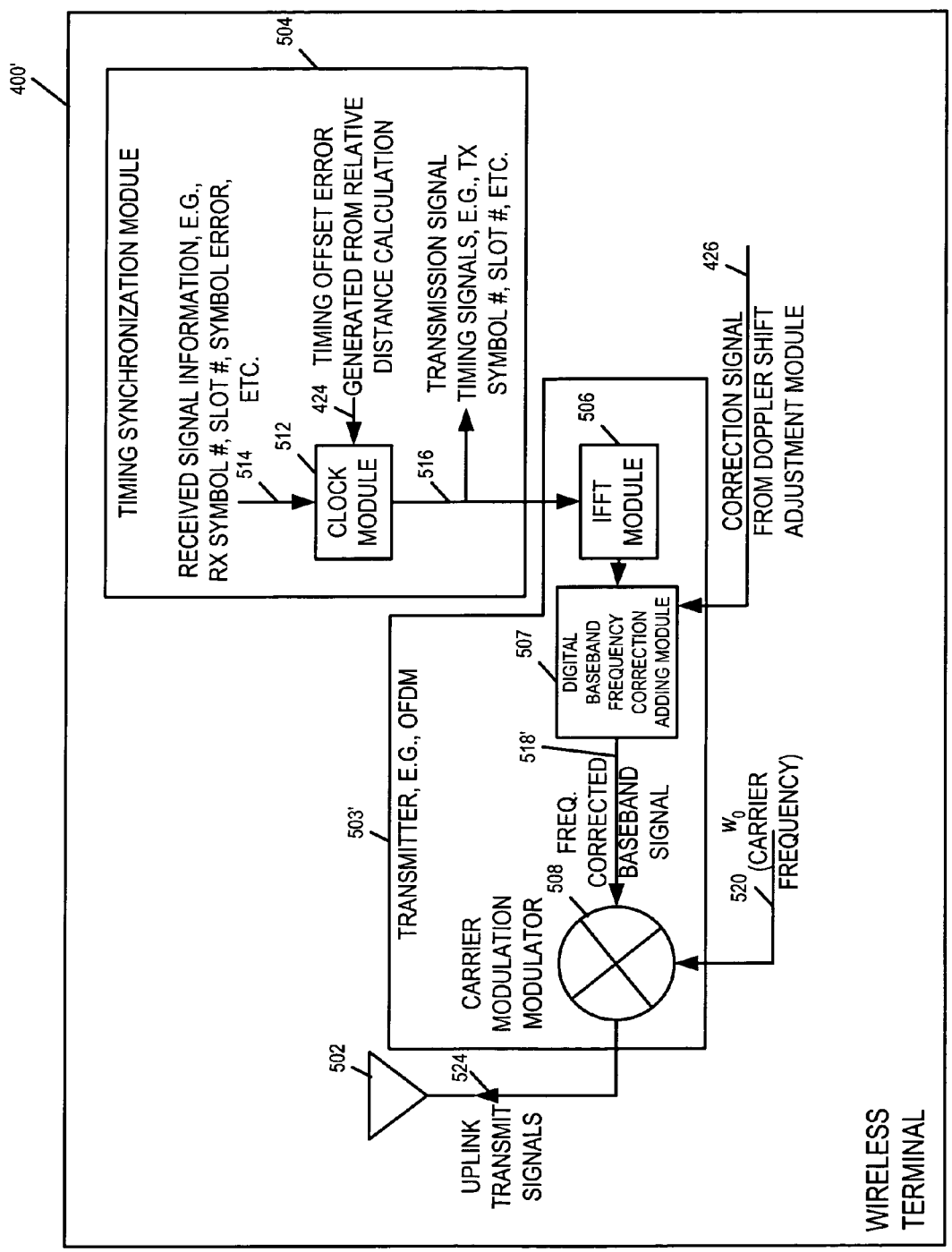
FIG. 5A is a drawing of an exemplary wireless terminal, implemented in accordance with the present invention and using methods of the present invention.

FIG. 5A is a drawing of exemplary wireless terminal 400', implemented in accordance with the present invention and using methods of the present invention. Wireless terminal 400' of FIG. 5A is a variation of WT 400 of FIG. 5. In WT 400' of FIG. 5A, the Doppler shift correction is added digitally in the baseband, rather than being added to the carrier frequency in the mixing module as is the case in the exemplary embodiment of FIG. 5. In exemplary cases, where the carrier frequency is very high, e.g., 2.1 GHz, adding a Doppler correction, e.g., a 500 Hz correction, may be more accurate if performed digitally in the baseband than in the carrier frequency.

WT 400' includes a digital baseband frequency correction adding module 507, which receives the output of the IFFT module 506 and the correction signal 426 from the Doppler shift adjustment module. In this exemplary embodiment, the IFFT module 506, carrier modulation modulator 508, and digital baseband frequency correction adding module 507 are included as part of the transmitter 503', e.g., an OFDM transmitter.

Module 507 shifts the baseband frequency by a correction 426. The output of the digital baseband frequency correction adding module 507, a frequency corrected baseband signal 518', is received by carrier modulation modulator 508. Module 508 also receive the carrier frequency $w_0$ 520. The carrier modulation module 508 outputs uplink transmit signals 524 which are communicated via transmit antenna 502.

In some embodiments, module 507 proceeds IFFT module 506. In other embodiments module 507 is incorporated as part of IFFT module 506.

Figure 6:
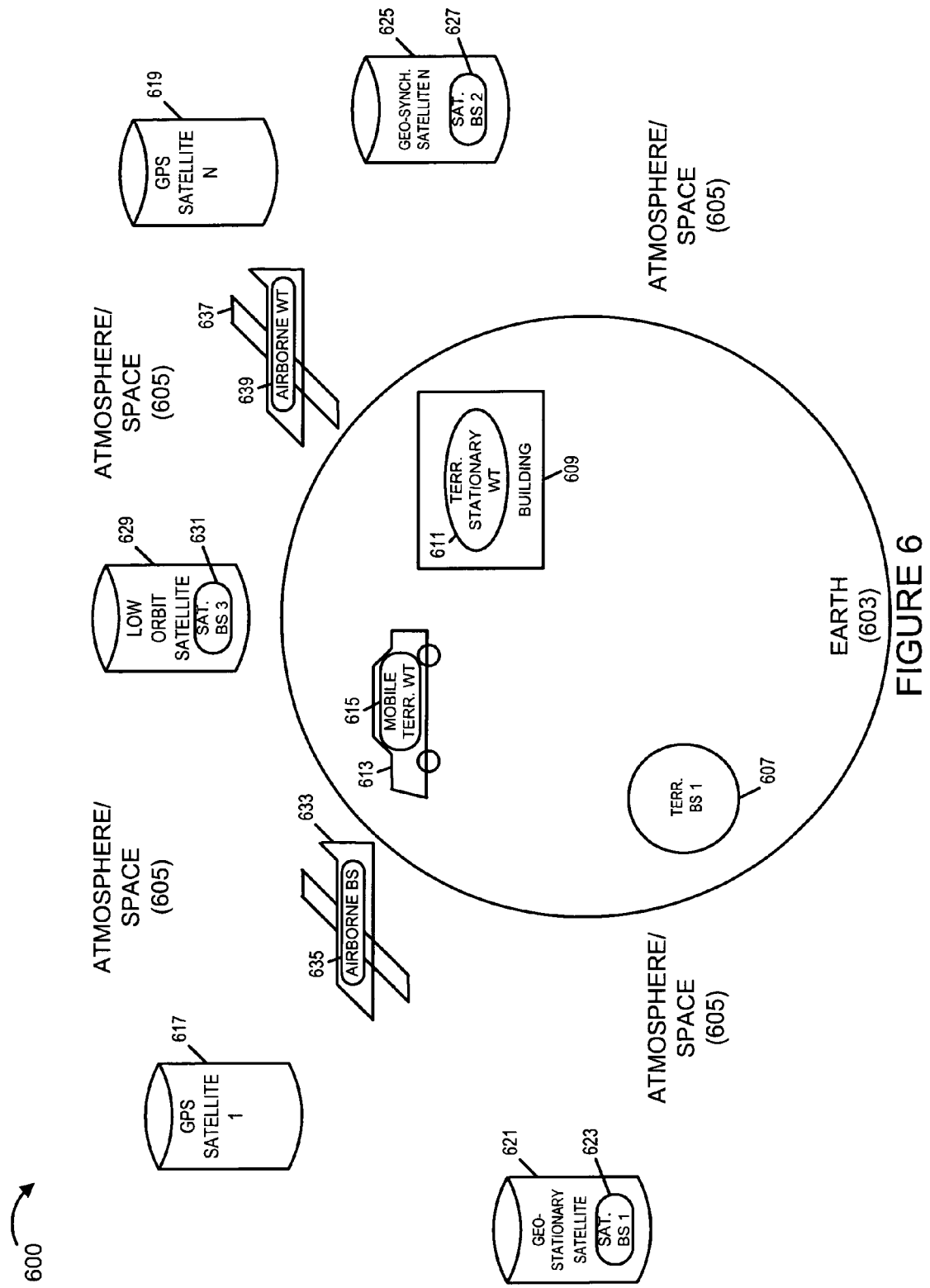
FIG. 6 is a drawing illustrating different exemplary types of base stations and wireless terminals that may exist in an exemplary wireless communications system in accordance with the present invention.

FIG. 6 is a drawing 600 illustrating different exemplary types of base stations and WTs that may exist in an exemplary wireless communications system in accordance with the present invention, e.g., system 100 of FIG. 1. Drawing 600 includes the earth 603 and the atmosphere/space 605. On the earth 603, the following elements are shown: an exemplary terrestrial base station 1 607, a building 609 including a terrestrial stationary wireless terminal 611, and a vehicle 613 including a mobile terrestrial wireless terminal 615. In the atmosphere/space 605 a network of GPS satellites (GPS satellite 1 617, GPS satellite N 619) are shown. WTs and/or BS, equipped with GPS receiver capability can receive GPS satellite signals to determine their position. In the atmosphere/space 605, the following elements are also shown: a geostationary satellite 621 including satellite base station 1 623, a low orbit satellite 629 including satellite base station 3 631, a geo-synchronous satellite 625 including satellite base station 2 627, an airborne platform 633 including an airborne BS 635, and an airborne platform 637 including an airborne WT 639.

Exemplary terrestrial base station 607, may be, e.g., a fixed location base station, whose location is stored in memory, e.g., in a look-up table, in wireless terminals, the location being associated with a base station identifier. The base station identifier can be broadcast from the base station 607, e.g., as part of a beacon signal or included in pilot signals. Alternatively or in addition, exemplary terrestrial base station 607, may be, e.g., a fixed location base station whose location is broadcast, e.g., periodically, for wireless terminals to receive and use. In this way, the wireless terminals need not be pre-programmed to store locations for each of the potential fixed position base stations to which it may connect, and changes can be made to the system, e.g., adding additional stations, moving assigned base stations, without the need to reprogram the wireless terminals with new base station position information. Exemplary terrestrial base station 607 may also be a movable base station, which broadcasts, e.g., periodically, its current position. For example, exemplary terrestrial base station 607 may be a portable base station which can be temporarily located at a site where added capacity is needed. For example extra capacity may be needed to support a large event, e.g., convention, show, concert, sporting event, operation, e.g., at a rural site. Extra capacity may also be needed at times to compensate for the loss of a landline communications network portion in a region. The temporarily location of such a base station 607 can be determined via GPS and the location broadcast to wireless terminal users.

Building 609, e.g., home, office, school, etc., includes an exemplary terrestrial stationary wireless terminal 611. The location of the stationary WT 611 may be determined at the time of installation, e.g., via GPS, and the WT location programmed into the WT 611. In this way, the WT 611 can benefit from timing and/or carrier frequency correction features using position information, without the expense of including a GPS receiver as part of the WT 611 operational needs.

Vehicle 613, e.g., a car, train, bus, truck, boat, motorcycle, etc., include mobile terrestrial WT 615. Mobile WT 615 may include an embedded GPS receiver and/or external interface to receive information from an external GPS receiver. Some mobile WTs 615 may include other means for determining current WT position, e.g., triangulation position determining methods based on processing received base station broadcast, e.g., beacon signal. Some mobile terrestrial wireless terminals 615 may be portable wireless terminal, e.g., cell phones, PDAs, portable PCs, carried by an individual, an that individual may or may not be in a vehicle at any given time and may be moving or stationary at any given time.

Geo-stationary satellite 621 includes satellite base station 623. The geo-stationary satellite maintains a fixed position in orbit with respect to a point on the earth, and information identifying that fixed position may be stored in the WTs. Geo-synchronous satellite 625 including satellite base station 2 627 may change its position with respect to a point on the earth on a repetitive time cycle; information identifying the satellites position at any given time, e.g., an ephemeris, may be loaded into the WTs. Low orbit satellite 629 including satellite base station 3 631 may change its position with respect to a point on the surface of the earth, and may not be synchronized to the rotations of the earth. Low orbit satellite 629 may include a GPS receiver, and the GPS receiver may determine satellite base station 3 631 position, and base station 631 may broadcast, e.g., periodically, its position to be used by WTs. Airborne platform 633, e.g., an airplane or other air vehicle includes an airborne base station 635. The air platform 633 includes position determining apparatus, e.g., GPS receiver, radar tracking, loran, signal triangulation apparatus, inertial apparatus, etc., for determining airborne BS 635 position, and the BS position is broadcast, e.g., periodically, for WTs to use. Airborne platform 637, e.g., an airplane or other air vehicle includes an airborne wireless terminal 639. The air platform 637 includes position determining apparatus, e.g., GPS receiver, radar tracking, loran, signal triangulation apparatus, inertial apparatus, etc., for determining airborne WT position. For example, airborne WT 639 may include an embedded GPS or an interface accepting position information determined from an external GPS located on airborne platform 637.

Figure 7:
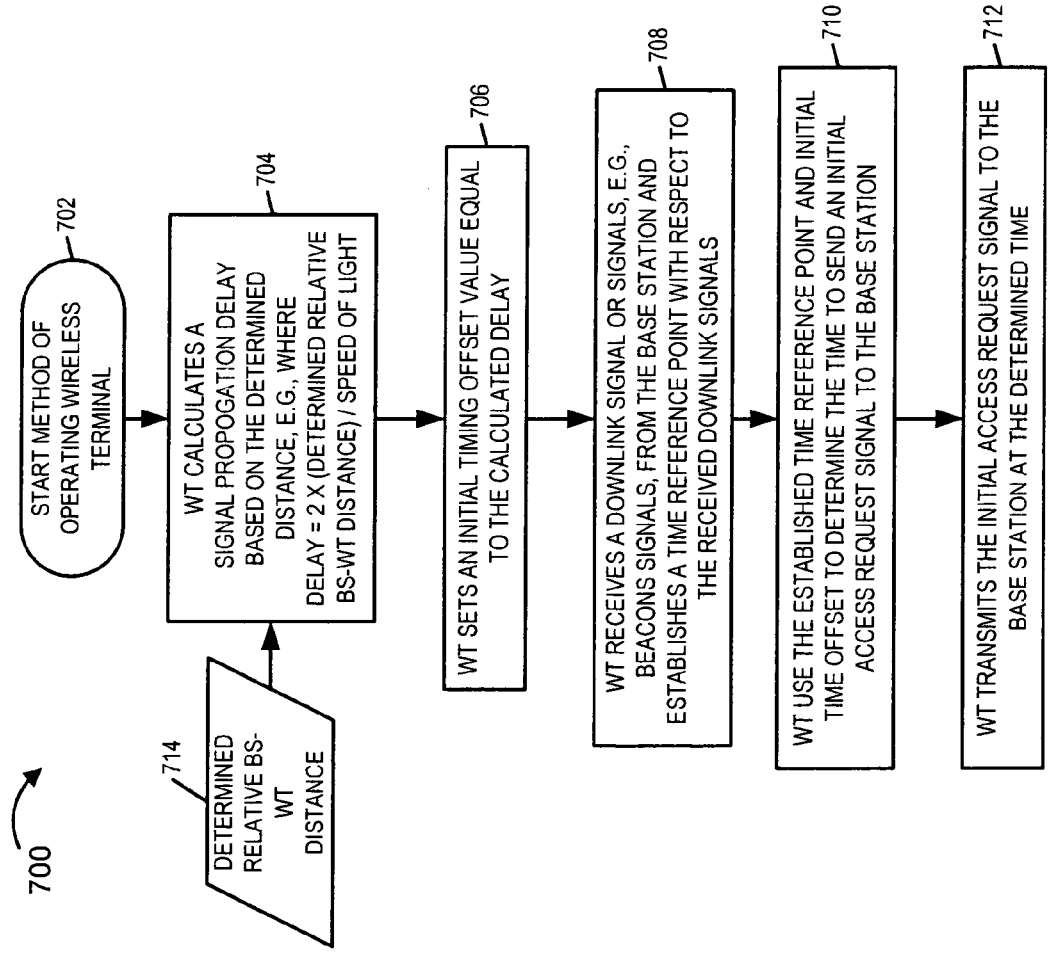
FIG. 7 is a flowchart of an exemplary method of operating a wireless terminal to use determined relative base station to wireless terminal distance information for initial "open loop" timing operations in accordance with the present invention.

FIG. 7 is a flowchart 700 of an exemplary method of operating a wireless terminal to use determined relative BS to WT distance information for initial "open loop" timing operations in accordance with the present invention. In step 702, the exemplary method starts. The WT has been previously turned on and has previously determined an estimate of the distance between the WT and BS, information 714, in accordance with the present invention. Various methods and techniques such as, e.g., including the use of location broadcast information, GPS derived position estimates, stored position information, and/or triangulation based on detected beacon signals may be used, in accordance with the present invention. Operation proceeds from step 702 to step 704, where the WT calculates a round trip signal propagation delay based on the determined distance between the BS and WT, where the delay=2=(determined relative BS–WT distance)/speed of light. Then, in step 706, the WT sets an initial timing offset value equal to the calculated delay. In step 708, the WT receives a downlink signal or signals, e.g., beacon signals, from the base station and establishes a time reference with respect to the received downlink signals. In step 710, the WT uses the established time reference point and the initial time offset to determine the time to send an initial access request signal to the base station. Then, in step 712, the WT transmits the initial access request signal to the base station at the determined time.

Figure 8:
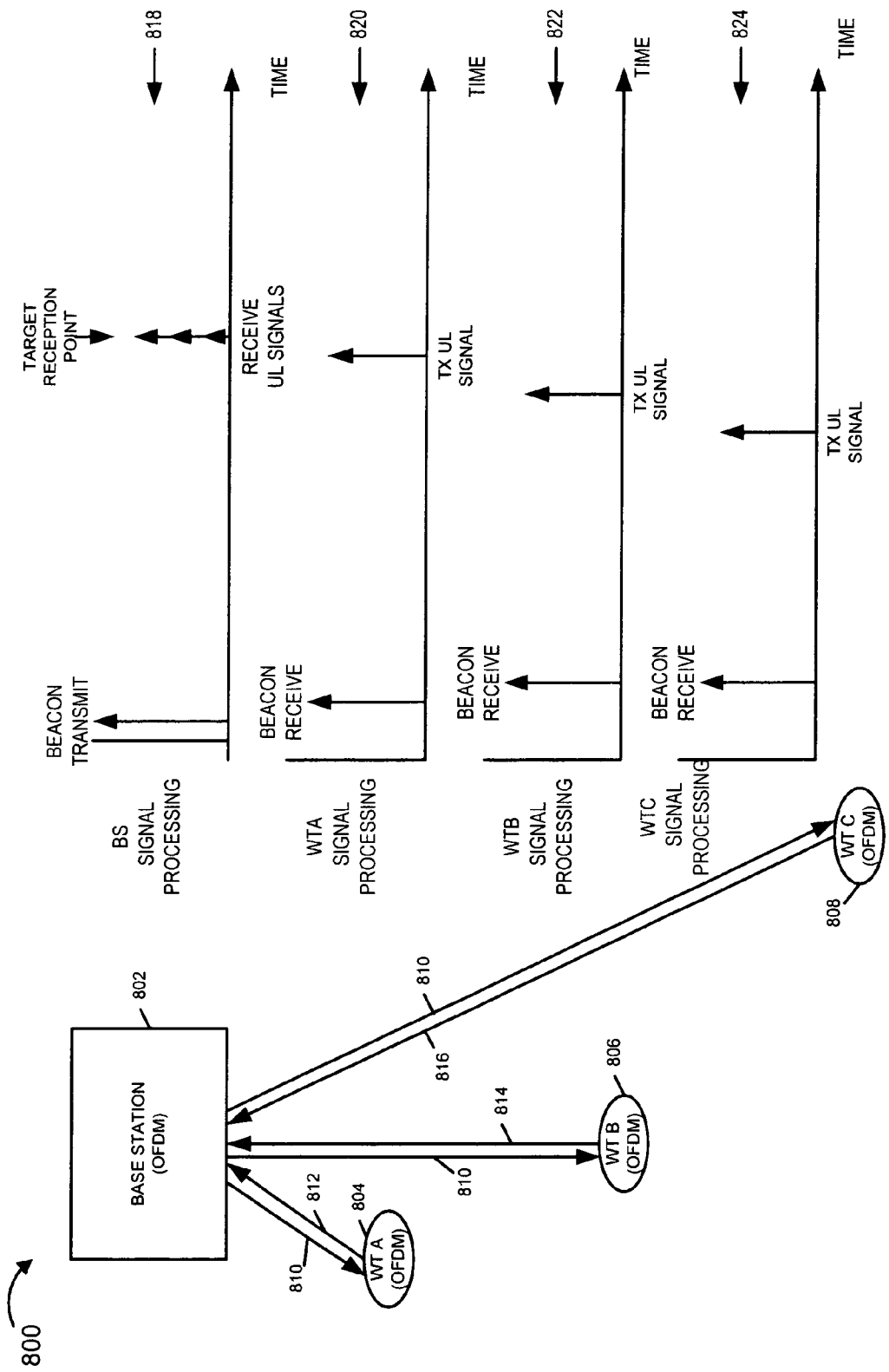
FIG. 8 is a drawing illustrating an exemplary orthogonal frequency division multiplexing (OFDM) wireless communications system, implemented in accordance with the present invention, including an exemplary base station and a plurality of wireless terminals, e.g., mobile nodes.

FIG. 8 is a drawing illustrating an exemplary OFDM wireless communications system 800, implemented in accordance with the present invention, including an exemplary base station 802 and a plurality of WTs, e.g., mobile nodes, (WTA 804, WTB 806, WTC 808). The distance between each WT and the BS is different, with (WTA 804, WTB 806, WTC 808) being (near, intermediate, far away), respectively with respect to the base station location. BS 802 broadcasts a beacon signal 810 which is received by each of the WTs (804, 806, 808); however, it is received at different times due to the different BS-WT distances. Drawing 818 shows signal processing from the BS perspective. Drawings (820, 822, 824) show signal processing from the perspective of (WTA, WTB, WTC). Each of the WTs transmits uplink signals. WT A transmits uplink signal 812; WT B transmits uplink signal 814; WT C transmits uplink signal 816. Each of the WTs use a different timing offset with respect to the received beacon such that uplink transmission signal arrive at the same time at the base station. In the OFDM system, where multiple wireless terminals simultaneously transmit uplink signals, it is important that the signal transmission times be controlled to result in timing synchronization at the base station receiver. It is important that the OFDM symbols from multiple WTs are aligned and thus orthogonal with one another. As shown in FIG. 8, each of the WTs has estimated a different timing offset, and applied the timing offset, to achieve orthogonality.

Figure 9:
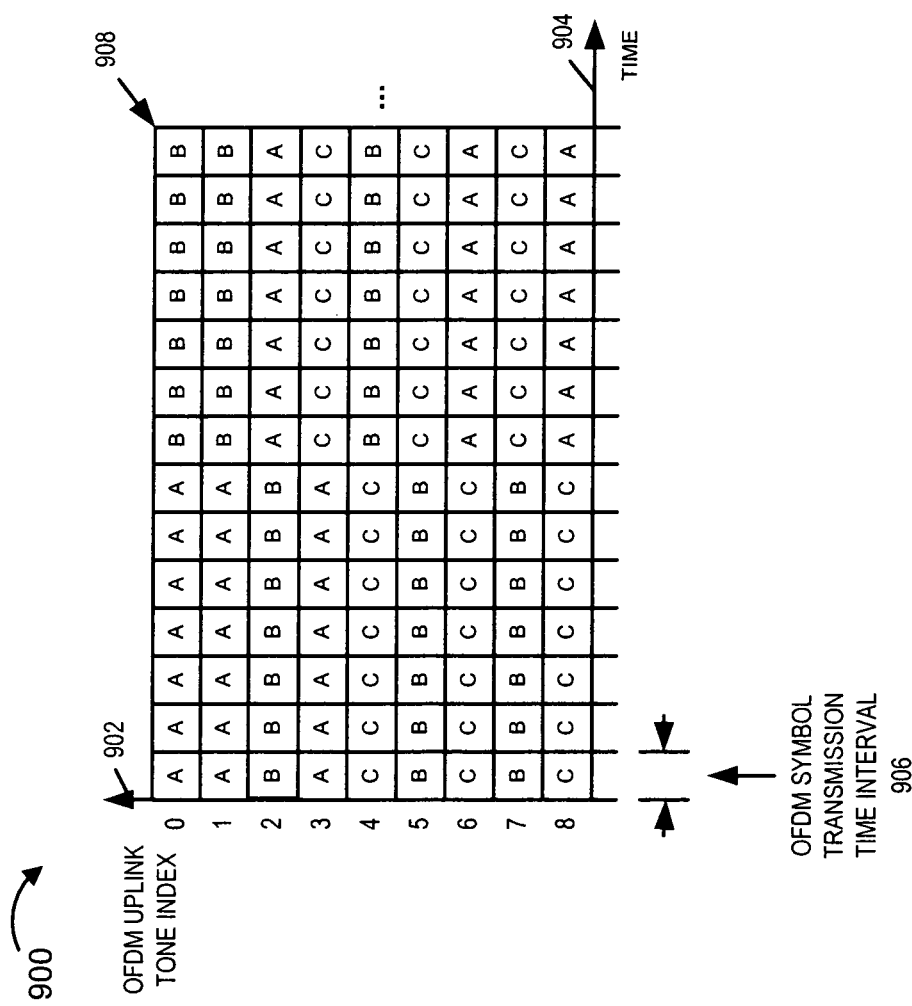
FIG. 9 is a drawing showing a set of tones used in an exemplary OFDM system, e.g., the system of FIG. 8.

FIG. 9 is a drawing 900 showing a set of tones used in an exemplary OFDM system, e.g., the system of FIG. 8. Vertical axis 902 shows OFDM uplink tone index, while horizontal axis 904 shows time. The time is subdivided into OFDM symbol transmission time intervals 906. Each box in grid 908 represents a unit of air link resource, a tone-symbol. The letter in each box indicates the WT to which the resource has been dedicated, e.g., to convey an uplink modulation symbol. In the example shown, each WT (A, B, C) is allocated 3 tones per OFDM symbol transmission time interval, with the set of 3 tones remaining constant for seven successive OFDM symbol transmission time interval, and then changing, e.g., according to an uplink tone hopping pattern implemented in the system.

Figure 10:
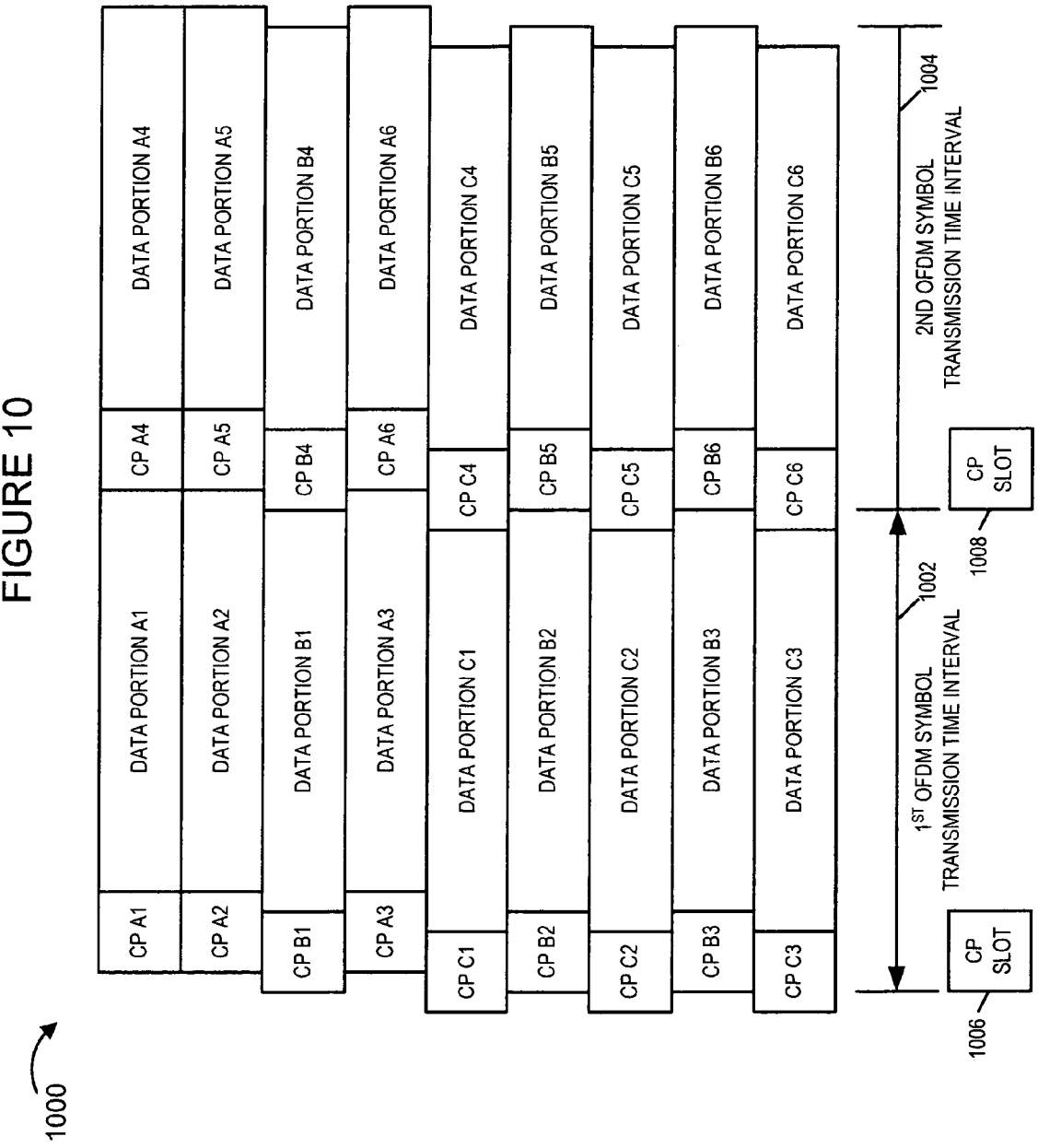
FIG. 10 is a drawing illustrating two consecutive OFDM symbol transmission time intervals from the perspective of the base station receiving the uplink signaling.

FIG. 10 is a drawing 1000 illustrating two consecutive OFDM symbol transmission time intervals (1002, 1004) from the perspective of the BS receiving the uplink signaling. During each OFDM symbol transmission time interval (1002, 1004), there is a nominal cyclic prefix (CP) portion (1006, 1008). The transmission time intervals of FIG. 10 may correspond to the $1^{st}$ two symbol transmission time intervals of FIG. 9. It is desirable that the received signals from each of the WTs be precisely aligned; however, timing synchronization errors may occur. It can be seen that each of the WTs (A, B, C) arrives at slightly different times, with the signal from WTC arriving slightly early, and the signal from WTA arriving slightly late. However, since each of the received signals is received such that its cyclic prefix portion at least partially overlaps with the nominal CP slot, the signal can be recovered. Methods and apparatus, in accordance with the present invention, are used to achieve, control, and maintain uplink timing synchronization at the base station receiver such that orthogonality is maintained.

Figure 11:
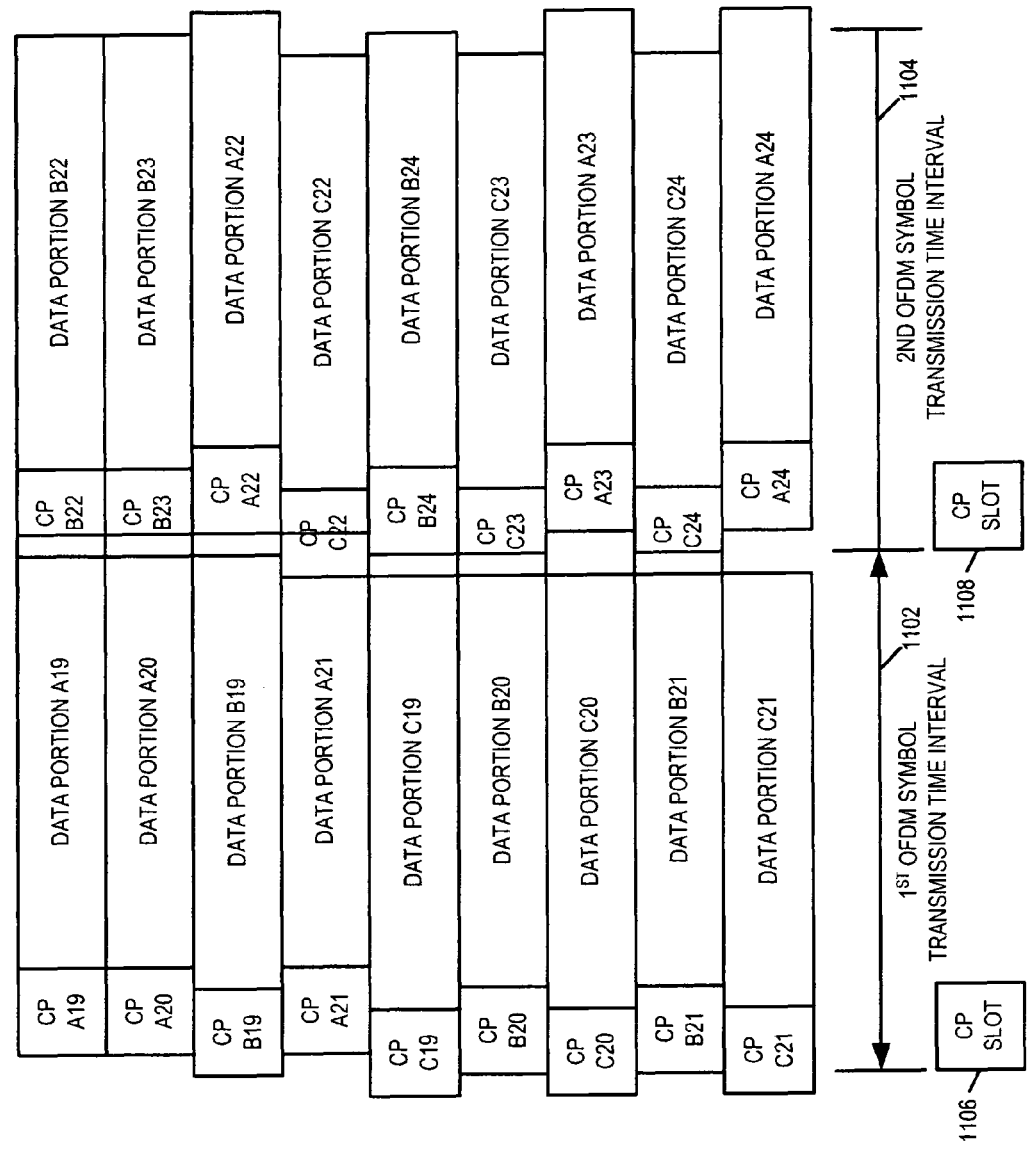
FIG. 11 is a drawing illustrating two other consecutive OFDM symbol transmission time intervals from the perspective of the base station receiving the uplink signaling.

FIG. 11 is a drawing 1100 illustrating two consecutive OFDM symbol transmission time intervals (1102, 1104) from the perspective of the BS receiving the uplink signaling. During each OFDM symbol transmission time interval (1102, 1104), there is a nominal CP portion (1106, 1108). The transmission time intervals of FIG. 11 may correspond to the seventh and eighth symbol transmission time intervals of FIG. 9. It is desirable that the received signals from each of the WTs be precisely aligned; however, timing synchronization errors may occur. It can be seen that each of the WTs (A, B, C) arrives at slightly different times, with the signal from WTC arriving slightly early, and the signal from WTA arriving slightly late. However, since each of the received signals is received such that its cyclic prefix portion at least partially overlaps with the nominal CP slot, the signal can be recovered. Methods and apparatus, in accordance with the present invention, are used to achieve, control, and maintain uplink timing synchronization at the base station receiver such that orthogonality is maintained.

Figure 12:
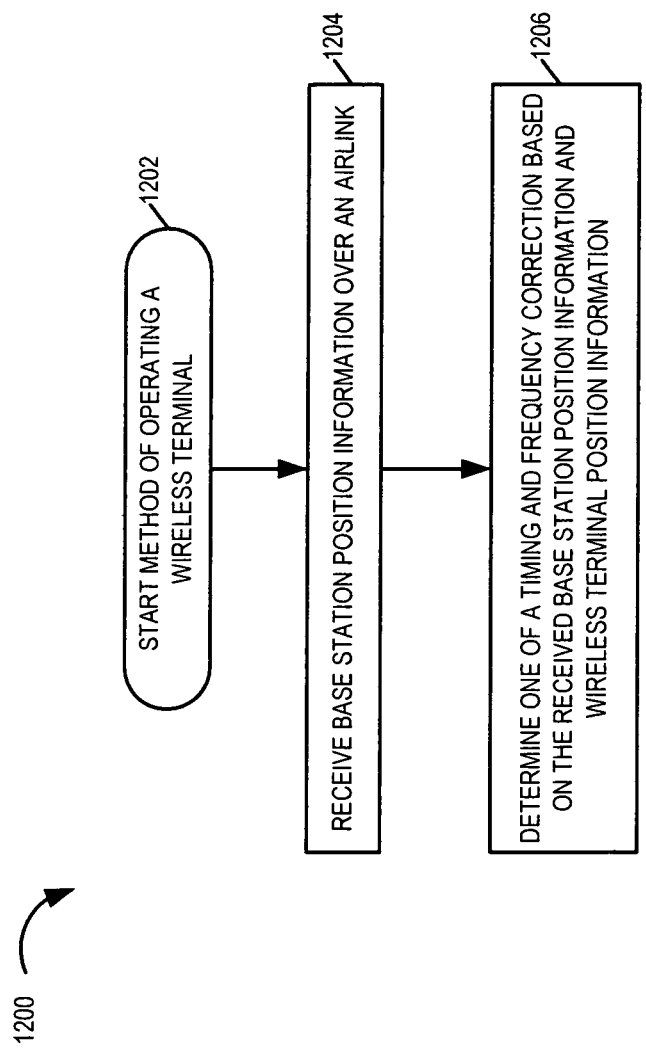
FIG. 12 is a flowchart of an exemplary method of operating a wireless terminal in accordance with the present invention.

FIG. 12 is a flowchart 1200 of an exemplary method of operating a wireless terminal in accordance with the present invention. Operation starts in step 1202, where the wireless terminal is powered on and initialized. Operation proceeds from step 1202 to step 1204. In step 1204, the wireless terminal receives base station position information, e.g., location coordinate information, over an airlink. In various embodiments, the base station position information communicated over the airlink is communicated using OFDM signaling. In some embodiments, the base station position information is received at periodic intervals. For example, in some such embodiments, the base station position is communicated at a rate sufficient to determine the distance between the base station and wireless terminal such that the determined distance does not change by more than 11 km between updates. In various embodiments, the base station position is communicated at a rate equal to or exceeding one base station position determination per 11 msec. In some embodiments, the WT is in an air vehicle and the base station position information is sent at least once every 36 seconds. In some embodiments, the WT is in an air vehicle and the base station position information is sent at least once every 1 second. Such rates of position information transmission can be important for some applications and they can reflect issues corresponding to base station timing structure relating to control signaling intervals and/or the rate of signaling that may be required to support a particular rate of motion which is expected to be encountered in a particular application such as an airplane base station and/or satellite based base station. In some embodiments, the base station transmits a signal which indicates its location at a particular point in time. In some such embodiments the base station may transmit a schedule indicating where it will be located at different points in time. In other embodiments the base station can specify in a transmission its location in terms of a path which the base station will follow over time. Such a specification may include a reference location, time at which the base station will be at the location or known distance from the reference location as well as base station velocity and/or direction. From this information, a wireless terminal can determine the base station's position and can compute the base stations expected position over time using the provided information.

Operation proceeds from step 1204 to step 1206. In step 1206, the wireless terminal determines one of a timing and frequency correction based on the received base station position information and wireless terminal position information. In some embodiments, the timing correction is an uplink roundtrip timing delay correction. In some embodiments, the frequency correction is a Doppler shift correction. In some embodiments, for at least some wireless terminals, e.g., some stationary wireless terminals without an embedded GPS, the wireless terminal position is pre-programmed in the wireless terminal. In some embodiments, for at least some wireless terminals, e.g., mobile nodes with GPS capability, the wireless terminal position is determined from GPS. In some embodiment, for at least some wireless terminals, e.g., mobile nodes with OFDM beacon processing capabilities, the wireless terminal position is determined from the triangulation of received signals, e.g., received beacon signals from a plurality of base stations.

Figure 13:
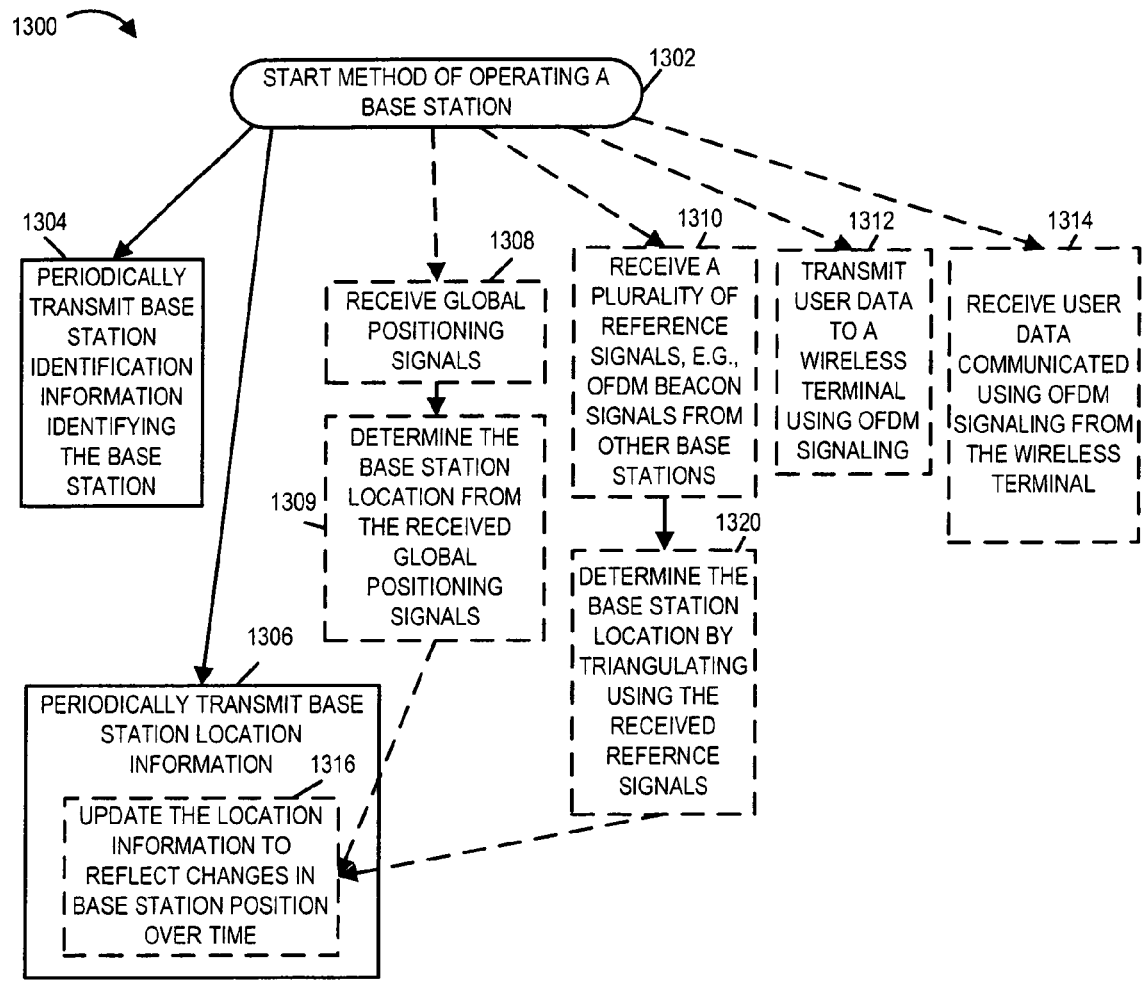
FIG. 13 is a flowchart of an exemplary method of operating a base station in accordance with the present invention.

FIG. 13 is a flowchart 1300 of an exemplary method of operating a base station in accordance with the present invention. Operation starts in step 1302, where the base station is powered on and initialized. Operation proceeds from step 1302 to step 1304 and step 1306. In various embodiments, operation also proceeds from step 1302 to one or more of steps 1308, 1310, 1312, and 1314.

In step 1304, the base station is operated to periodically transmit bases station identification information identifying the base station. In some embodiments, base station identification information is communicated via OFDM beacon signals.

In step 1306, the base station is operated to periodically transmit base station location information, e.g., location coordinate information. In some embodiments, the base station location information is transmitted at least once every one second. In various embodiments, the base station location information is transmitted over a wireless communications channel using OFDM signaling. In some embodiments, e.g., embodiments where the base station is a moving base station, step 1306 includes sub-step 1316. In sub-step 1316, the base station is operated to update the location information to reflect changes in base station position over time. In some embodiments, the base station position is updated at periodic intervals using stored location information included in the base station indicating the location of the base station at different points in time. In some such embodiments, the base station is a non-geostationary satellite and the stored location information includes information on the orbital path of the satellite base station. In some embodiments, the base station transmits base station position at a rate sufficient to determine the distance between the base station and a wireless terminal such that the determined distance does not change by more than 11 km between location updates. In some embodiments, the base station position is transmitted on a periodic basis at a rate which results in at least one location information transmission every 11 msec. In some embodiments, the base station transmits a signal which indicates its location at a particular point in time. In some such embodiments the base station may transmit a schedule indicating where it will be located at different points in time. In other embodiments the base station can specify in a transmission its location in terms of a path which the base station will follow over time. Such a specification may include a reference location, time at which the base station will be at the location or known distance from the reference location as well as base station velocity and/or direction. From this information, a wireless terminal can determine the base station's position and can compute the base stations expected position over time using the provided information.

In step 1308, the base station is operated to receive global positioning signals. The received global positioning signals may be received from an embedded GPS and/or from an external GPS coupled to the base station. In step 1309, the base station determines the base station location from the received global positioning signals. The determined location information is forwarded to be used in sub-step 1316.

In step 1310, the base station receives a plurality of reference signals, e.g., OFDM beacon signals from other base stations. Then, in step 1320, the base station determines its location by distance determination techniques such as triangulation using the received reference signals. The determined location information is forwarded to be used in sub-step 1316.

In step 1312, the base station is operated to transmit user data to a wireless terminal using OFDM signaling and in step 1314, the base station is operated to receive user data communicated using OFDM signaling from the wireless terminal.

In some embodiments, the base station is included in an air vehicle, e.g., an airplane, unmanned air vehicle, blimp, balloon, etc. In some embodiments, the base station is included in a satellite, e.g., a non-geostationary satellite. In some embodiments, the base station is a portable terrestrial base station, e.g., temporarily installed at a fixed location. In some embodiments, the base station is a moving terrestrial base station, e.g., included on a moving land or water vehicle.

In various embodiments, the communications system includes a plurality of base stations, which each periodically transmit base station identification information and base station location information. In some such embodiments, adjacent base stations are associated with different identification information. In some embodiments, different base stations within a type of base stations, e.g., different air vehicle base stations or different satellite base stations have different identification information. In some embodiments, base station identification information includes a class identifier, e.g., stationary, moving terrestrial, moving air vehicle, geo-stationary satellite, non-geostationary satellite. In some such embodiments, the base station position signaling is a function of the type of base station.

Figure 14:
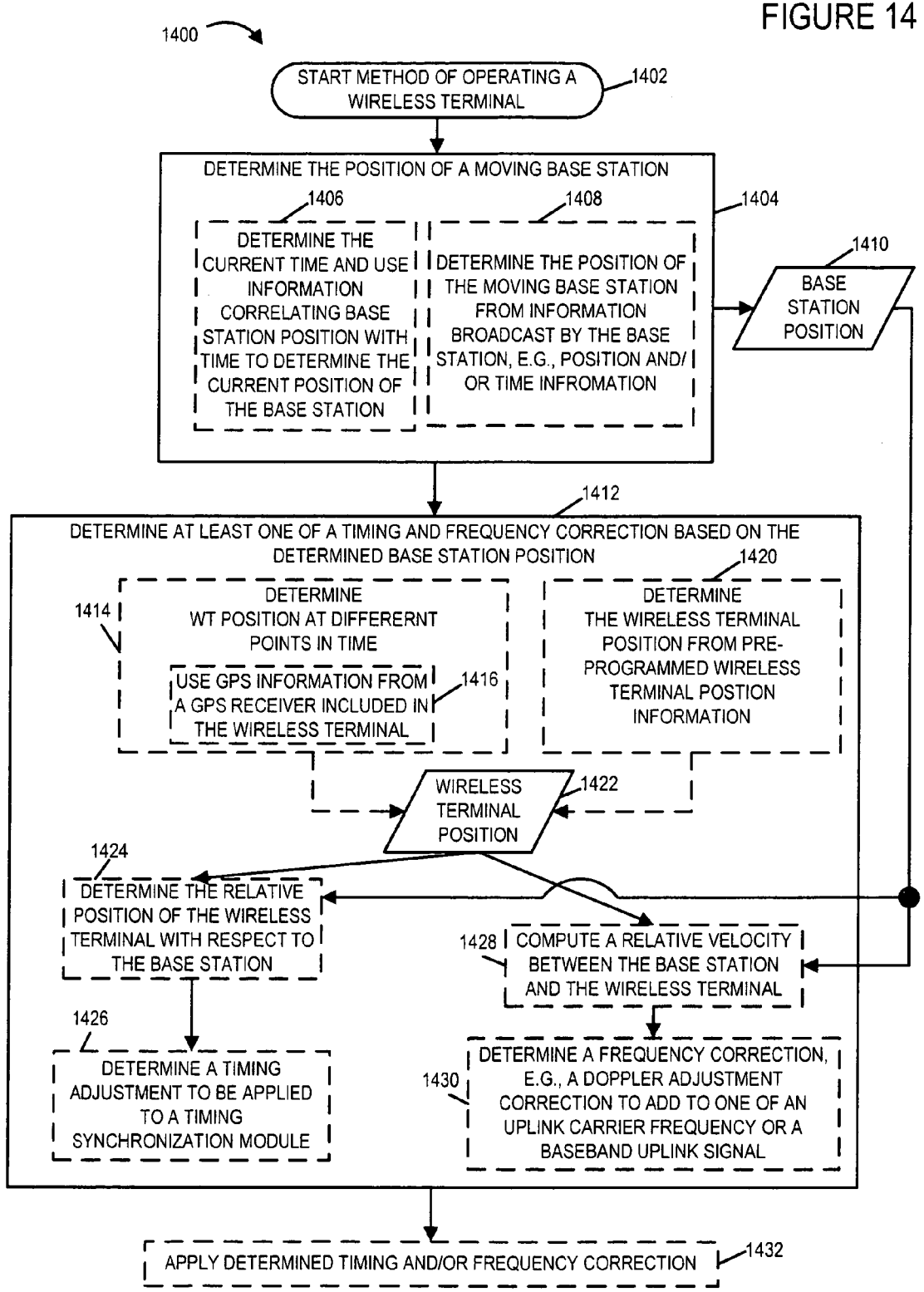
FIG. 14 is a flowchart of an exemplary method of operating a wireless terminal in accordance with the present invention.

FIG. 14 is a flowchart 1400 of an exemplary method of operating a wireless terminal in accordance with the present invention. The exemplary method starts in step 1402, where the wireless terminal is powered on and initialized. Operation proceeds from step 1402 to step 1404. In step 1404, the wireless terminal determines the position of a moving base station and outputs base station position 1410. In some embodiments, one of sub-steps 1406 and 1408 is used for determining the position of the moving base station.

In sub-step 1406, the wireless terminal determines the current time and uses information correlating the base station position with time to determine the current position of the base station. For example, the base station may be a non-geostationary satellite and the information correlating the base station position with time may be satellite orbit position information as a function of time.

In sub-step 1408, the wireless terminal determines the position of the moving base station from information broadcast by the base station, e.g., position and/or time information. For example, the base station may be located in air vehicle, and the position may be broadcast periodically. In some embodiments, the base station position may be broadcast with a time tag indicating the time of the position fix.

Operation proceeds from step 1404 to step 1412. In step 1412, the wireless terminal determines at least one of a timing and frequency correction based on the determined base station position. In various embodiments, some of sub-steps 1414, 1420, 1424, 1426, 1428, and 1430 are performed. For example depending on the type of wireless terminal sub-step 1414 or sub-step 1420 are performed; sub-step 1424 and 1426 are performed where a timing correction is determined; sub-step 1428 and 1430 are performed where a frequency correction is determined.

In sub-step 1414, the wireless terminal, e.g., a mobile node, determines its position at different points in time. In some such embodiments, sub-step 1416 is performed as part of sub-step 1414. In sub-step 1416, the wireless terminal uses GPS information from a GPS receiver included in the wireless terminal to determine its position.

In sub-step 1420, the wireless terminal, e.g., a stationary wireless terminal, determines its position from preprogrammed wireless terminal position information stored in the wireless terminal. The output of either sub-step 1414 or sub-step 1420 is wireless terminal position 1422.

In sub-step 1424, the wireless terminal uses the base station position 1410 and the wireless terminal position 1422 to determine the relative position of the wireless terminal with respect to the base station. Then, in step 1426, the wireless terminal determines a timing adjustment to be applied to a timing synchronization module.

In sub-step 1428, the wireless terminal computes a relative velocity between the base station and the wireless terminal, e.g., using at least one wireless terminal position determination 1422 and at least two base station position determinations 1410 of the moving base station taking into account position determination timing. Then, in step 1430, the wireless terminal determines a frequency correction, e.g., a Doppler adjustment correction to add to one of an uplink carrier frequency or a baseband uplink signal.

Operation proceeds from step 1412 to step 1432. In step 1432 the wireless terminal applies the determined timing and/or frequency correction.

The techniques of the present invention may be implemented using software, hardware and/or a combination of software and hardware. The present invention is directed to apparatus, e.g., mobile nodes such as mobile terminals, base stations, communications system which implement the present invention. It is also directed to methods, e.g., method of controlling and/or operating mobile nodes, base stations and/or communications systems, e.g., hosts, in accordance with the present invention. The present invention is also directed to machine readable medium, e.g., ROM, RAM, CDs, hard discs, etc., which include machine readable instructions for controlling a machine to implement one or more steps in accordance with the present invention.

In various embodiments nodes described herein are implemented using one or more modules to perform the steps corresponding to one or more methods of the present invention, for example, signal processing, message generation and/or transmission steps. Thus, in some embodiments various features of the present invention are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, the present invention is directed to a machine-readable medium including machine executable instructions for causing a machine, e.g., processor and associated hardware, to perform one or more of the steps of the above-described method(s).

While described in the context of an OFDM system, at least some of the methods and apparatus of the present invention are applicable to a wide range of communications systems including many non-OFDM and/or non-cellular systems.

Numerous additional variations on the methods and apparatus of the present invention described above will be apparent to those skilled in the art in view of the above description of the invention. Such variations are to be considered within the scope of the invention. The methods and apparatus of the present invention may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods of the present invention.

What is claimed is:

1. A wireless terminal comprising:
   a receiver for receiving, over an airlink, a signal from a base station communicating a base station determined current base station position;
   a relative distance determination module for determining the relative distance between the base station and the wireless terminal based on the communicated current base station position;
   a timing synchronization module for performing a timing adjustment operation as a function of the determined relative distance;
   a relative velocity determination module for determining the relative velocity of said wireless terminal relative to said base station;
   a Doppler shift determination module coupled to said relative velocity determination module for outputting a Doppler shift correction signal, the Doppler shift correction signal based on the determined relative velocity of said wireless terminal relative to said base station; and
   a combining module for generating uplink signals for transmission from said wireless terminal, the uplink signals comprising the Doppler shift correction signal based on the determined relative velocity of said wireless terminal relative to said base station combined with a baseband signal or a carrier frequency.

2. The wireless terminal of claim 1, further comprising a wireless terminal position determination module configured to determine the position of the wireless terminal without the use of a GPS signal and for providing wireless terminal position information to said relative distance determination module.

3. The wireless terminal of claim 1, wherein updated base station position is received at different points in time; and wherein said relative distance determination module operates, using said updated base station position, at a rate sufficient to determine the distance between the base station and wireless terminal such that the determined distance does not change by more than 11 km between sequential distance determinations.

4. The wireless terminal of claim 1, wherein said base station determined current base station position is received by said receiver at time intervals less than or equal to 11 msec.

5. The wireless terminal of claim 1, wherein said wireless terminal is a stationary device with a position that is fixed, said wireless terminal including memory storing pre-programmed wireless terminal position information.

6. The wireless terminal of claim 1,
   wherein said wireless terminal includes a global positioning signal receiver; and
   a global positioning signal based wireless position determination module which determines the wireless terminal position from received global positioning signals.

7. The wireless terminal of claim 2, wherein said wireless terminal position determination module is a triangulation module which determines wireless terminal position from signals received from a plurality of base stations.

8. The wireless terminal of claim 1, wherein said wireless terminal is in an air vehicle.

9. The wireless terminal of claim 8, wherein said base station determined current base station position is received at least once every 36 seconds.

10. The wireless terminal of claim 1, wherein said receiver is an OFDM receiver and wherein said base station determined current base station position is communicated over the airlink using OFDM signaling.

11. The wireless terminal of claim 1, wherein said timing synchronization module includes a clock module which generates a transmission symbol timing control signal as a function of a timing offset error determined from the determined relative distance.

12. The wireless terminal of claim 1, wherein the base station determined current base station position includes a specification of the position of the base station in terms of a path which the base station will follow over time.

13. The wireless terminal of claim 12, wherein the specification of the position of the base station includes a reference location, a time at which the base station will be at the reference location, and a base station velocity.

14. The wireless terminal of claim 1, further comprising:
   a processor coupled to said receiver.

15. The wireless terminal of claim 1, further comprising:
   an antenna for receiving signals coupled to said receiver.

16. The wireless terminal of claim 1, further comprising:
   a memory including stored position information indicating the position of said wireless terminal.

17. The wireless terminal of claim 1, further comprising a wireless terminal position determination module for determining the position of said wireless terminal from signals received from a plurality of base stations or from preprogrammed information indicating a stationary position of said wireless terminal and for providing wireless terminal position information to said relative distance determination module.

18. A communications method comprising:
    operating a first base station to:
      periodically transmit first base station identification information identifying the first base station; and
      periodically transmit, over an airlink, a signal communicating a first base station determined current base station position, to a wireless communication terminal, wherein a timing adjustment is made at the wireless communication terminal based on a distance between the first base station and the wireless communication terminal and a Doppler shift frequency adjustment at the wireless communication terminal is determined from the first base station determined current base station position, the Doppler shift frequency adjustment based on a determined relative velocity of said wireless communication terminal relative to said first base station, the wireless communication terminal generating uplink signals for transmission from the wireless communication terminal, the uplink signals comprising the Doppler shift frequency adjustment based on the determined relative velocity of said wireless communication terminal relative to said first base station combined with a baseband signal or a carrier frequency.

19. The method of claim 18, wherein the first base station is a moving base station, wherein the step of periodically transmitting said signal communicating said first base station determined current base station position includes:
    updating said current base station position to reflect changes in base station position over time.

20. The method of claim 19, wherein said current base station position is location coordinate information.

21. The method of claim 20, wherein said current base station position is updated at periodic intervals using stored location information included in said first base station indicating the location where the first base station will be at different points in time.

22. The method of claim 21, wherein the first base station is a non-geostationary satellite base station and wherein said stored location information includes information on the orbital path of said satellite base station.

23. The method of claim 21, wherein the first base station transmits current base station position at a rate sufficient to determine the distance between the first base station and a wireless terminal such that the determined distance does not change by more than 11 km between location transmission updates.

24. The method of claim 20, wherein said current base station position is transmitted on a periodic basis at a rate which results in at least one location information transmission every 11 msec.

25. The method of claim 18, further comprising:
operating the first base station to receive global positioning signals; and
operating the first base station to determine the current base station position from the received global positioning signals, the determined current base station position being transmitted in said signal communicating said first base station determined current base station position.

26. The method of claim 18, further comprising:
operating the first base station to determine its position by triangulating received signals.

27. The method of claim 26, wherein the received signals are OFDM beacon signals from a plurality of base stations.

28. The method of claim 20, wherein the first base station is included in an air vehicle.

29. The method of claim 28, wherein said current base station position is sent at least once every 1 second.

30. The method of claim 18, wherein said first base station transmits said current base station position over a wireless communications channel using OFDM signaling.

31. The method of claim 18, further comprising:
operating the first base station to transmit user data to a wireless terminal using OFDM signaling; and
operating the first base station to receive user data communicated using OFDM signaling from said wireless terminal.

32. The method of claim 18, further comprising:
operating a second base station having, for at least a period of time, a transmission coverage area located adjacent a coverage area of said first base station to:
periodically transmit second base station identification information identifying the second base station, said second base station identification information being different from said first base station identification information; and
periodically transmit second base station location information.

33. The method of claim 19,
wherein the first and second base stations are moving base stations; and
wherein the step of periodically transmitting second base station location information includes:
updating said second base station location information to reflect changes in the position of said second base station over time.

34. The method of claim 33, wherein said first and second base stations are air vehicle based base stations.

35. The method of claim 33, wherein said first and second base stations are satellite based base stations.

36. The method of claim 18, wherein the first base station is a portable ground based base station using OFDM signaling.

37. A wireless terminal comprising:
means for receiving, over an airlink, a signal from a base station communicating a base station determined current base station position;
means for determining the relative distance between the base station and the wireless terminal based on the communicated current base station position;
means for performing a timing adjustment operation as a function of the determined relative distance;
means for determining the relative velocity of said wireless terminal relative to said base station;
means for outputting a Doppler shift correction signal, the Doppler shift correction signal based on the determined relative velocity of said wireless terminal relative to said base station; and
means for generating uplink signals for transmission from said wireless terminal, the uplink signals comprising the Doppler shift correction signal being based on the determined relative velocity of said wireless terminal relative to said base station combined with a baseband signal or a carrier frequency.

38. The wireless terminal of claim 37, further comprising means for determining the position of the wireless terminal without the use of a GPS signal and for providing wireless terminal position information to said relative distance determination module.

39. The wireless terminal of claim 37, wherein said base station determined current base station position is received by said means for receiving at time intervals less than or equal to 11 msec.

40. A method of operating a wireless terminal, comprising:
receiving, over an airlink, a signal from a base station communicating a base station determined current base station position;
determining the relative distance between the base station and the wireless terminal based on the communicated current base station position;
performing a timing adjustment operation as a function of the determined relative distance;
determining the relative velocity of said wireless terminal relative to said base station;
outputting a Doppler shift correction signal, the Doppler shift correction signal being based on the determined relative velocity of said wireless terminal relative to said base station; and
generating uplink signals for transmission from said wireless terminal, the uplink signals comprising the Doppler shift correction signal based on the determined relative velocity of said wireless terminal relative to said base station combined with a baseband signal or a carrier frequency.

41. The method of claim 40, further comprising:
determining the position of the wireless terminal without the use of a GPS signal and for providing wireless terminal position information to said relative distance determination module.

42. The method of claim 40, wherein said base station determined current base station position is received at time intervals less than or equal to 11 msec.

43. A non-transitory machine readable medium for use in a wireless terminal, the non-transitory machine readable medium including executable instructions which when executed by a processor, control said wireless terminal to:

receive, over an airlink, a signal from a base station communicating a base station determined current base station position;

determine the relative distance between the base station and the wireless terminal based on the communicated current base station position;

perform a timing adjustment operation as a function of the determined relative distance;

determine the relative velocity of said wireless terminal relative to said base station;

output a Doppler shift correction signal, the Doppler shift correction signal being based on the determined relative velocity of said wireless terminal relative to said base station; and generate uplink signals for transmission from said wireless terminal, the uplink signals comprising the Doppler shift correction signal based on the determined relative velocity of said wireless terminal relative to said base station combined with a baseband signal or a carrier frequency.

44. A first base station, comprising:

a transmitter configured to periodically transmit first base station identification information identifying the first base station; and a base station position signaling module for controlling the first base station to periodically transmit, over an airlink, a signal communicating a first base station determined current base station position, to a wireless communication terminal, wherein a timing adjustment is made at the wireless communication terminal based on a distance between the first base station and the wireless communication terminal and a Doppler shift frequency adjustment at the wireless communication terminal is determined from the first base station determined current base station position, the Doppler shift frequency adjustment based on a determined relative velocity of said wireless communication terminal relative to said first base station, the wireless communication terminal generating uplink signals for transmission from the wireless communication terminal, the uplink signals comprising the Doppler shift frequency adjustment based on the determined relative velocity of said wireless communication terminal relative to said first base station combined with a baseband signal or a carrier frequency.

45. The first base station of claim 44, wherein said current base station position is location coordinate information.

46. The first base station of claim 44, further comprising:

a receiver configured to receive global positioning signals; and a position determination module configured to determine the current base station position from the received global positioning signals, the determined current base station position being transmitted in said signal communicating said first base station determined current base station position.

47. A first base station, comprising:

means for transmitting configured to periodically transmit first base station identification information identifying the first base station; and means for controlling the first base station to periodically transmit, over an airlink, a signal communicating a first base station determined current base station position, to a wireless communication terminal, wherein a timing adjustment is made at the wireless communication terminal based on a distance between the first base station and the wireless communication terminal and a Doppler shift frequency adjustment at the wireless communication terminal is determined from the first base station determined current base station position, the Doppler shift frequency adjustment based on a determined relative velocity of said wireless communication terminal relative to said first base station, the wireless communication terminal generating uplink signals for transmission from the wireless communication terminal, the uplink signals comprising the Doppler shift frequency adjustment based on the determined relative velocity of said wireless communication terminal relative to said first base station combined with a baseband signal or a carrier frequency.

48. The first base station of claim 47, wherein said current base station position is location coordinate information.

49. The first base station of claim 47, further comprising:

means for receiving global positioning signals; and means for determining the current base station position from the received global positioning signals, the determined current base station position being transmitted in said signal communicating said first base station determined current base station position.

50. A non-transitory machine readable medium for use in a base station, the non-transitory machine readable medium including executable instructions which when executed by a processor, control said base station to:

periodically transmit base station identification information identifying the base station; and periodically transmit, over an airlink, a signal communicating a base station determined current base station position, to a wireless communication terminal, wherein a timing adjustment is made at the wireless communication terminal based on a distance between the base station and the wireless communication terminal and a Doppler shift frequency adjustment at the wireless communication terminal is determined from the base station determined current base station position, the Doppler shift frequency adjustment based on a determined relative velocity of said wireless communication terminal relative to said base station, the wireless communication terminal generating uplink signals for transmission from the wireless communication terminal, the uplink signals comprising the Doppler shift frequency adjustment based on the determined relative velocity of said wireless communication terminal relative to said base station combined with a baseband signal or a carrier frequency.

* * * * *